(12) United States Patent
Johta et al.

(10) Patent No.: US 9,421,995 B2
(45) Date of Patent: Aug. 23, 2016

(54) STEERING DEVICE

(71) Applicant: NSK Ltd., Tokyo (JP)

(72) Inventors: Masaya Johta, Gunma (JP); Hideki Kojima, Gunma (JP); Wataru Hagiwara, Gunma (JP); Daiki Orihara, Gunma (JP); Ryoichi Suzuki, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/653,644

(22) PCT Filed: Oct. 17, 2014

(86) PCT No.: PCT/JP2014/077725
§ 371 (c)(1),
(2) Date: Jun. 18, 2015

(87) PCT Pub. No.: WO2015/064393
PCT Pub. Date: May 7, 2015

(65) Prior Publication Data
US 2016/0039450 A1    Feb. 11, 2016

(30) Foreign Application Priority Data

Oct. 30, 2013  (JP) ................................ 2013-225851
Dec. 17, 2013  (JP) ................................ 2013-260159
Feb. 21, 2014  (JP) ................................ 2014-031692
Aug. 8, 2014  (JP) ................................ 2014-162386

(51) Int. Cl.
*B62D 1/19* (2006.01)
*B62D 1/185* (2006.01)
*B62D 1/184* (2006.01)

(52) U.S. Cl.
CPC ............... *B62D 1/185* (2013.01); *B62D 1/184* (2013.01); *B62D 1/192* (2013.01); *B62D 1/195* (2013.01)

(58) Field of Classification Search
CPC .......... B62D 1/195; B62D 1/19; B62D 1/192; B62D 1/197; B62D 1/18
USPC ........................................................ 280/777
See application file for complete search history.

(56) References Cited

U.S. PATENT DOCUMENTS 2,639,626 A * 5/1953 Snyder ................... B62D 1/192
                                                180/78
6,339,970 B1 * 1/2002 Blex ....................... B62D 1/192
                                                188/371

(Continued)

FOREIGN PATENT DOCUMENTS

JP          49-19234 Y1     5/1974
JP          08-276853 A    10/1996

(Continued)

OTHER PUBLICATIONS

International Search Report of PCT/JP2014/077725 dated Jan. 20, 2015.

(Continued)

*Primary Examiner* — Keith Frisby
(74) *Attorney, Agent, or Firm* — Sughrue Mion, PLLC

(57) ABSTRACT

A steering device which contracts by an impulse load. A steering device includes an inner column having a cylindrical shape, a base plate having a first hole opened therein, an outer column having a cylindrical shape into which at least a part of the inner column is inserted, and having a slit formed by notching one insertion side end of the inner column, an outer column bracket to tighten the outer column along with a telescopic friction plate, and a connection member provided at a position straddling the first hole and a second hole, and detachably connecting the base plate and the inner column bracket.

10 Claims, 27 Drawing Sheets

(56) References Cited

U.S. PATENT DOCUMENTS

| | | | |
|---|---|---|---|
| 2001/0019205 A1 | 9/2001 | Ikeda et al. | |
| 2004/0145169 A1* | 7/2004 | Satou | B62D 1/195 280/777 |
| 2007/0068311 A1 | 3/2007 | Shimoda et al. | |
| 2009/0020996 A1* | 1/2009 | Geibel | B62D 1/192 280/777 |
| 2009/0249916 A1* | 10/2009 | Ridgway | B62D 1/192 74/492 |

FOREIGN PATENT DOCUMENTS

| | | |
|---|---|---|
| JP | 2002-120731 A | 4/2002 |
| JP | 2005-138758 A | 6/2005 |
| JP | 2007-069800 A | 3/2007 |
| JP | 2008-195180 A | 8/2008 |
| JP | 2009-029152 A | 2/2009 |

OTHER PUBLICATIONS

Written Opinion of the International Searching Authority of PCT/JP2014/077725 dated Jan. 20, 2015.

* cited by examiner

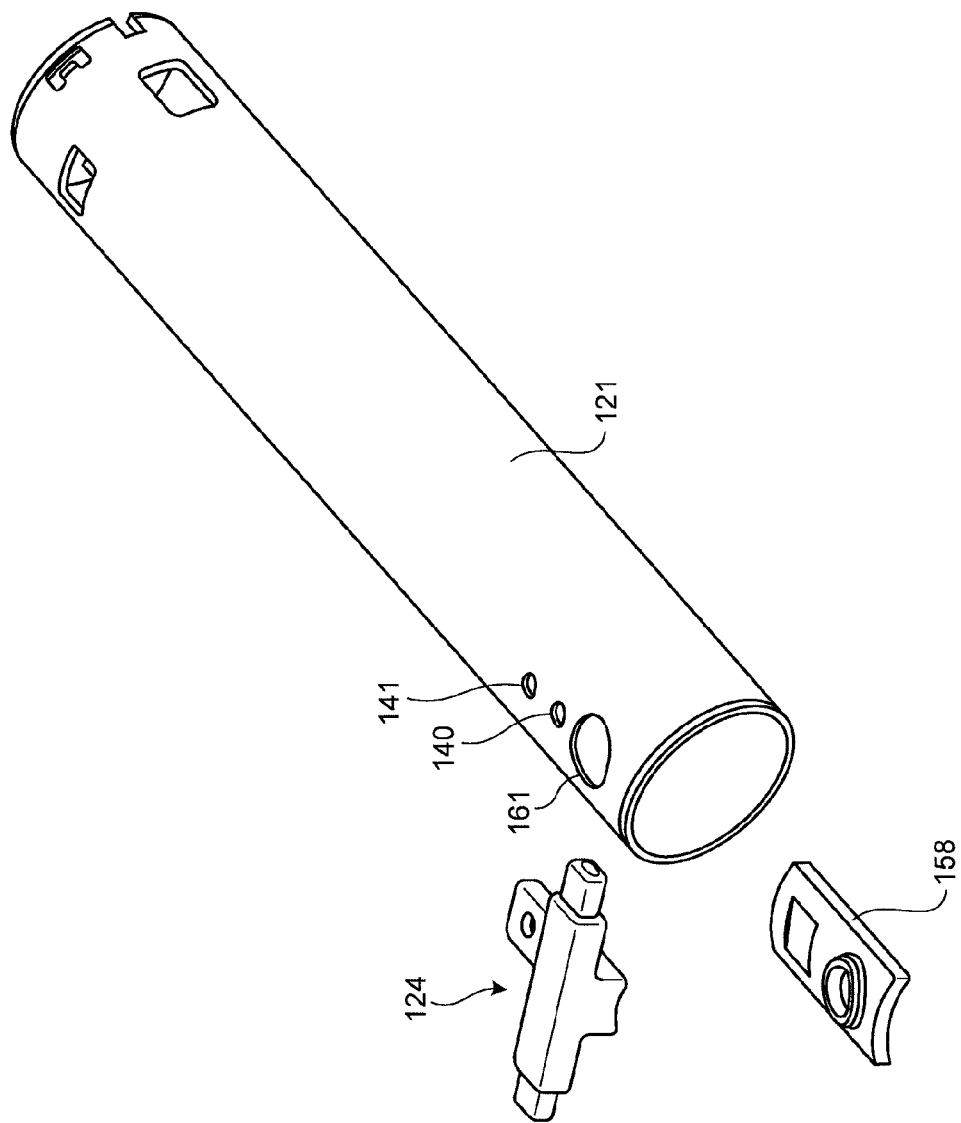

STEERING DEVICE

CROSS REFERENCE TO RELATED APPLICATIONS

This is a National Stage of International Application No. PCT/JP2014/077725 filed Oct. 17, 2014, claiming priority based on Japanese Patent Application No. 2013-225851 filed Oct. 30, 2013, Japanese Patent Application No. 2013-260159 filed Dec. 17, 2013, Japanese Patent Application No. 2014-031692 filed Feb. 21, 2014, and Japanese Patent Application No. 2014-162386 filed Aug. 8, 2014, the contents of all of which are incorporated herein by reference in their entirety.

BACKGROUND OF THE INVENTION

1. Field of the Invention

The present invention relates to a steering device.

2. Description of the Related Art

As a structure for supporting a steering device that gives a rudder angle to a vehicle wheel with the rotation of a steering wheel, a technique using a capsule is widely known. For example, in a technique disclosed in Prior Art 1, when an excessive load is applied to a steering column attached to a vehicle body through a capsule so that the steering column is pressed toward the front side of the vehicle body, a part of the capsule is cut so that the steering column moves toward the front side of the vehicle body, and hence a driver (an operator) is protected from the upthrust (secondary collision) of the steering wheel. Meanwhile, Prior Art 2 discloses a structure in which a telescopic fixed member slides due to an impact load. In this structure, since the fixed member is inserted into a groove, there is a need to lengthen the groove in order to take a large stroke amount. As a result, there is a tendency that the column increases in size.

PRIOR ART

Prior Art 1: Japanese Laid-open Patent Publication No. 2007-69800

Prior Art 2: Japanese Laid-open Patent Publication No. 2009-29152

As in the technique disclosed in Prior Art 1 in which the steering column is attached to the vehicle body through the capsule, the steering column is dropped when the capsule is cut. For this reason, when a setting value for a separation load in which the steering column moves toward the front side of the vehicle body is decreased in order to protect an operator having a light weight from the secondary collision, the steering column is easily dropped due to an erroneous operation. When the steering column is dropped due to the erroneous operation, it is difficult to perform the steering operation later. For this reason, it is difficult to decrease the setting value for the separation load.

The invention is made in view of the above-described circumstances, and an object of the invention is to provide a steering device capable of suppressing a problem where a steering column is dropped by an erroneous operation is decreased even when a setting value of a separation load in which the steering column moves toward the front side of a vehicle body.

SUMMARY OF THE INVENTION

It is an object of the present invention to at least partially solve the problems in the conventional technology. According to an aspect of the invention, a steering device includes an inner column having a cylindrical shape and supporting an input shaft connected to a steering wheel; a base plate having a first hole opened therein, and provided on an outer periphery surface of the inner column; an outer column having a cylindrical shape into which at least a part of the inner column is inserted, and having a slit formed by notching one end of the router column; an outer column bracket fixed to a vehicle body side member so as to support the outer column and to tighten the outer column along with a telescopic friction plate having a plate shape; an inner column bracket having a second hole opened therein and supported by the telescopic friction plate; and a connection member provided at a position straddling the first hole and the second hole, and detachably connecting the base plate and the inner column bracket.

Accordingly, in a steering device according to the invention, when an excessive load is applied to a steering wheel, the load is transmitted to an inner column through an input shaft, and hence the inner column is moved forward. When the inner column moves, a base plate which is fixed through a fixing tool moves forward together. Meanwhile, an inner column bracket which is supported by a telescopic friction plate does not move. For this reason, since a shear force is applied to a connection member, the connection member is cut when the load exceeds the allowable shear force of the connection member. When the connection member is cut, the connection between the inner column and the inner column bracket is released. When the connection between the inner column and the inner column bracket is released, the inner column is supported in the axial direction by a friction force generated between the inner column and an outer column. For this reason, the inner column of the steering column may move toward the front side of the vehicle. Further, even when the connection member is cut, the outer column is supported by the outer column bracket fixed to a vehicle body side member. Further, the inner column is supported by the outer column. For this reason, even when the connection member is cut, the steering column is not dropped. Thus, the steering device according to the invention may suppress a problem in which the steering column is dropped by an erroneous operation even when the setting value of the separation load in which the steering column moves toward the front side of the vehicle is decreased.

An allowable shear force of the connection member is smaller than an allowable shear force of a fixing tool connecting the base plate and the inner column to each other. Accordingly, it is possible to suppress a problem in which the fixing tool is cut before the connection member is cut.

The inner column bracket includes a front side concave portion, which is a recess, in a surface opposite to a surface facing the base plate, the second hole is opened in at least a part of a bottom surface of the front side concave portion, and the connection member is a resinous member that is injected into the first hole, the second hole, and the front side concave portion. Accordingly, since the separation of the connection member solidified at the front side concave portion is prevented, it is possible to suppress a problem in which the connection member comes off from the first hole and the second hole. For this reason, it is possible to suppress a problem in which the inner column bracket and the base plate connected to each other in advance are detached from each other.

The base plate includes a rear side concave portion which is a recess in a surface facing the inner column, the first hole is opened in at least a part of a bottom surface of the rear side concave portion, and the connection member is a resinous member that is injected into the first hole, the second hole, and the rear side concave portion. Accordingly, since the separation of the connection member solidified at the rear side concave portion is prevented, it is possible to suppress a problem in which the connection member comes off from the first hole and the second hole. For this reason, it is possible to suppress a problem in which the inner column bracket and the base plate connected to each other in advance are detached from each other.

The connection member is a resinous pin that is inserted through the first hole and the second hole. Accordingly, when the resinous pin is inserted into the first hole and the second hole while the first hole and the second hole communicate with each other, the inner column bracket and the base plate are connected to each other. An operation of inserting the resinous pin may be performed in a short time since the solidification time is not needed compared to the operation of charging and solidifying the resinous member. For this reason, the steering device may easily connect the inner column bracket and the base plate to each other.

The connection member is provided so that a hook portion having an outer periphery larger than the inner periphery of each of the first hole and the second hole is provided at one end and a slot is provided from the hook portion toward the other end. Accordingly, the hook portion may be easily elastically deformed when the hook portion is pressed from the outer periphery. When the connection member is inserted into the first hole and the second hole from the end near the hook portion, the hook portion is elastically deformed while contacting the inner walls of the first hole and the second hole. When the hook portion reaches the outside while passing through the first hole and the second hole, the elastic deformation of the hook portion returns to the original state, and hence the hook portion regulates the movement of the connection member in the axial direction. For this reason, since the separation of the hook portion is prevented, it is possible to suppress a problem in which the connection member comes off from the first hole and the second hole. Thus, the steering device easily connects the inner column bracket and the base plate to each other and suppresses the separation of the inner column bracket and the base plate.

The base plate includes a rear side concave portion, which is a recess, in a surface facing the inner column, and the first hole is opened in at least a part of a bottom surface of the rear side concave portion. Accordingly, the rear side concave portion forms a gap between the inner column and the base plate while the inner column side surface contacts the inner column. For this reason, a portion that is projected from the first hole in the connection member toward the inner column does not easily interfere with the inner column. Thus, the steering device may decrease or remove the number of steps of a process performed on the inner column in order to prevent the interference between the connection member and the inner column.

The connection member is a ball plunger of which a ball plunger body is fixed to the second hole and a head portion of a ball at a front end engages with the first hole. Accordingly, when the ball plunger is inserted into the first hole and the second hole while the first hole and the second hole communicate with each other, the inner column bracket and the base plate are connected to each other. An operation of inserting the ball plunger may be performed in a short time since the solidification time is not needed compared to the operation of charging and solidifying the resinous member. For this reason, the steering device may easily connect the inner column bracket and the base plate to each other.

An allowable deformation force of the head portion of the ball plunger is smaller than an allowable shear force of a fixing tool connecting the base plate and the inner column to each other. Accordingly, it is possible to suppress a problem in which the fixing tool is cut before the connection member (the ball plunger) is deformed.

The base plate includes a fixing tool concave portion which is a recess in a surface facing the inner column bracket, a fixing tool hole as a penetration hole is opened in a part of a bottom surface of the fixing tool concave portion, and the fixing tool connecting the base plate and the inner column bracket to each other is inserted into the fixing tool hole. Accordingly, the head portion of the fixing tool is not easily projected toward the inner column bracket in relation to the surface facing the inner column bracket. For this reason, the head portion of the fixing tool hardly contacts the inner column bracket when the base plate moves in the axial direction. Thus, the steering device according to the invention may suppress a problem in which the movement of the base plate in the axial direction is disturbed by the inner column bracket.

According to the invention, even when a setting value of a separation load, in which the steering column moves toward the front side of a vehicle body, is decreased, it is possible to provide a steering device capable of suppressing a problem where a steering column is dropped by an erroneous operation.

BRIEF DESCRIPTION OF THE DRAWINGS

FIG. 22 is a diagram illustrating an inner plate attachment method according to the third embodiment.

DETAILED DESCRIPTION OF THE PREFERRED EMBODIMENTS

A mode (an embodiment) for carrying out the invention will be described in detail with reference to the drawings. The invention is not limited to the content described in the embodiments below. Further, components described below include a component which is easily supposed by the person skilled in the art and a component which has substantially the same configuration. Further, the components described below may be appropriately combined with one another.

First to Fourth Embodiments

Figure 1:
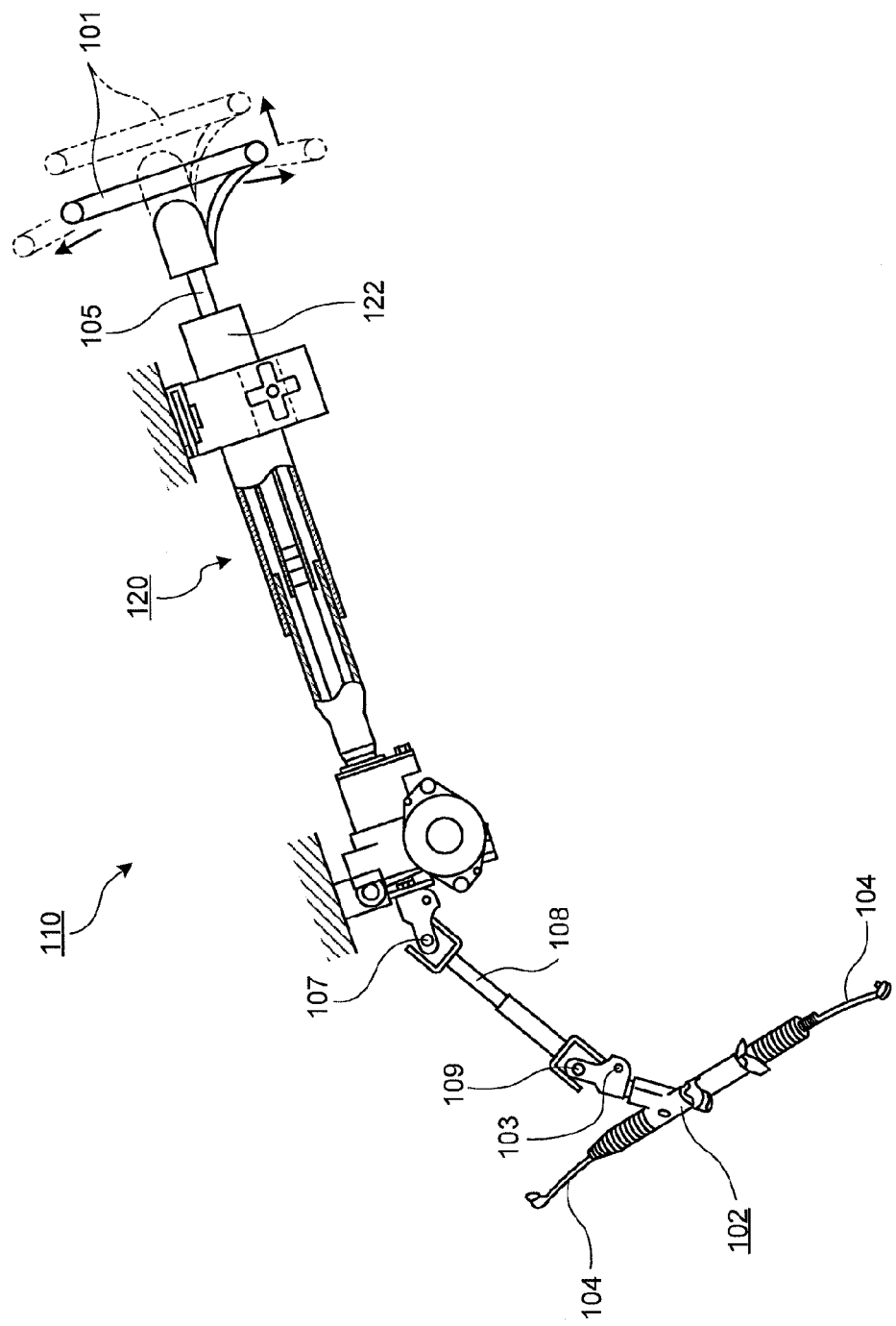
FIG. 1 is a schematic diagram illustrating an entire steering device of first to fourth embodiments.
Figure 2:
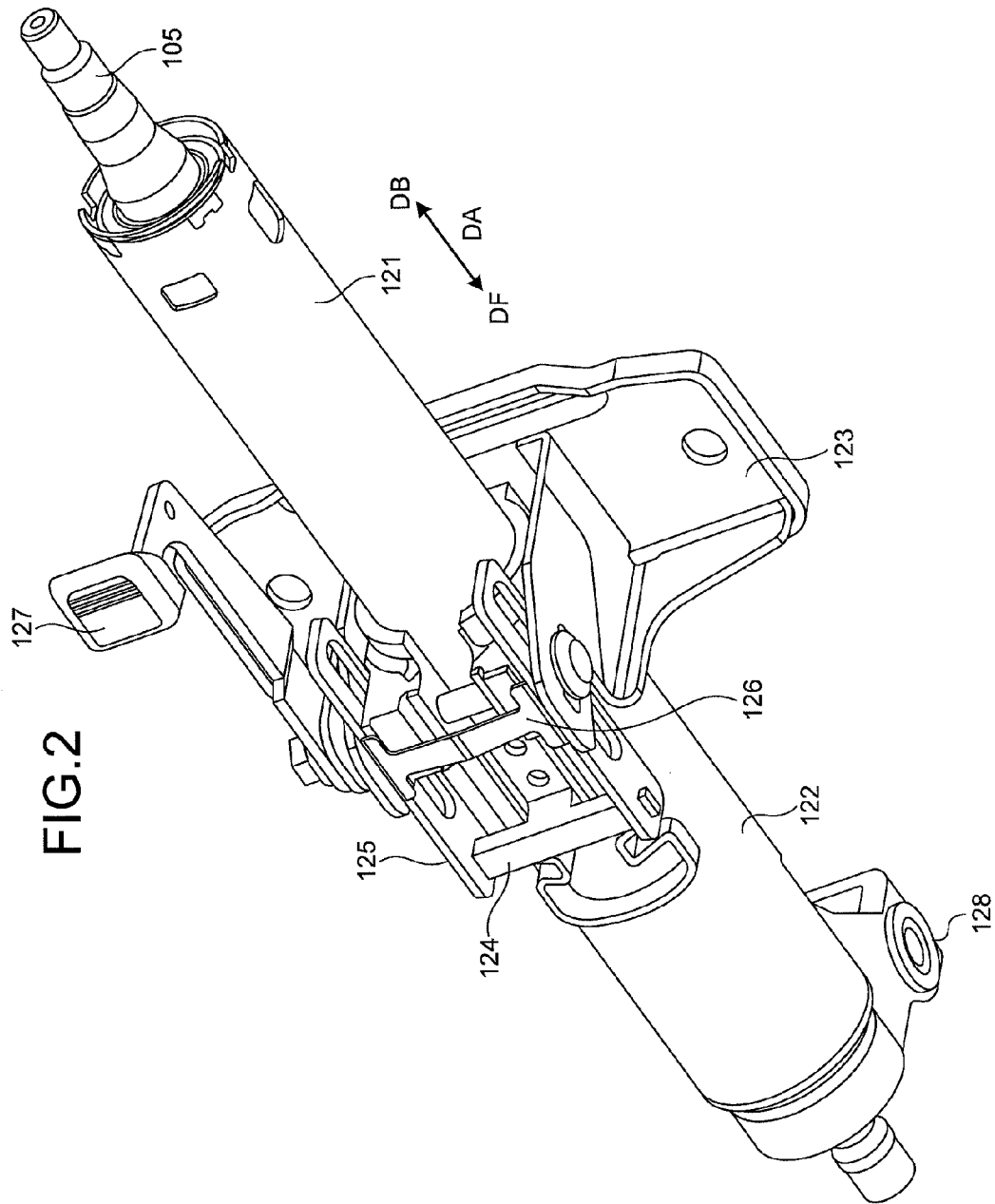
FIG. 2 is a perspective view illustrating a steering column apparatus of the steering device of the first to fourth embodiments.
Figure 3:
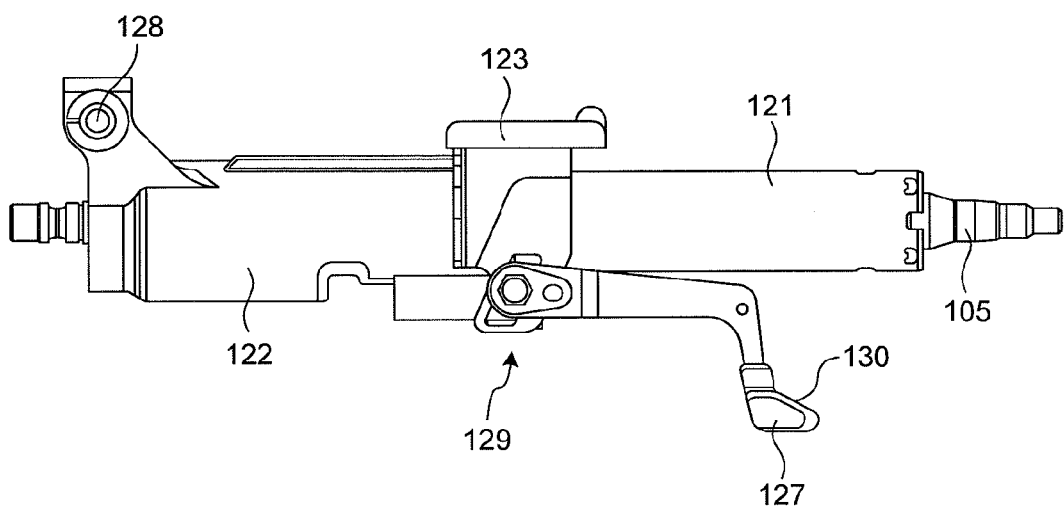
FIG. 3 is a diagram illustrating a side surface of the steering column apparatus according to the first to fourth embodiments.
Figure 4:
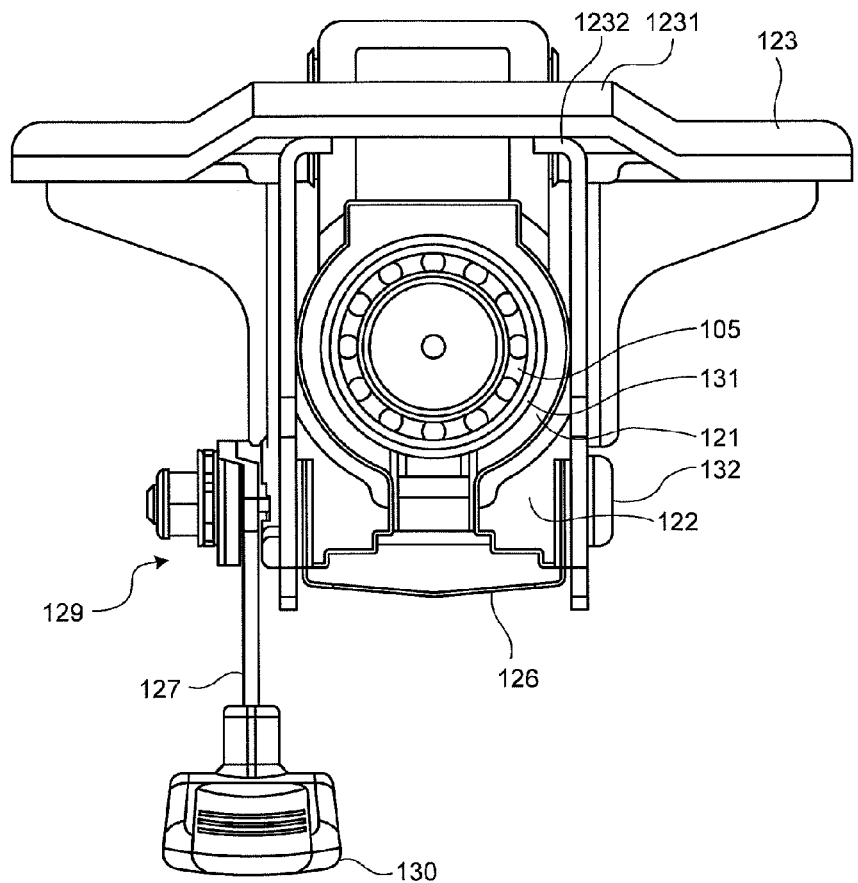
FIG. 4 is a diagram illustrating a front surface (at the rear side) of the steering column apparatus according to the first to fourth embodiments.
Figure 5:
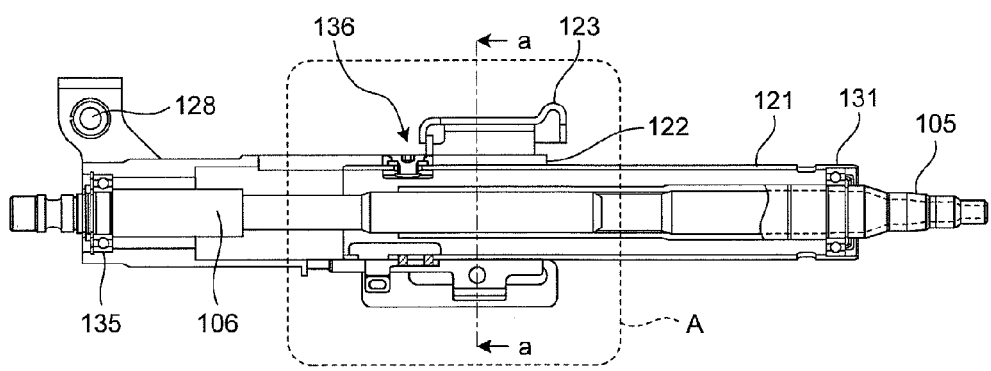
FIG. 5 is a diagram illustrating a side surface (a part of a cross section) of the steering column apparatus according to the first embodiment.
Figure 6:
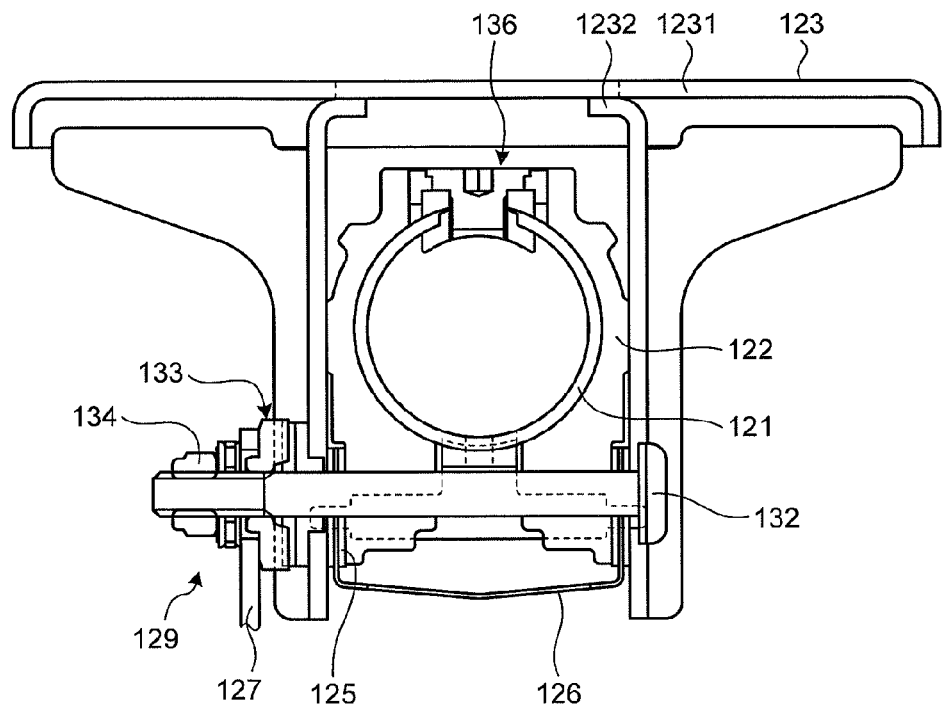
FIG. 6 is a cross-sectional view taken along the line a-a of FIG. 5.
Figure 7:
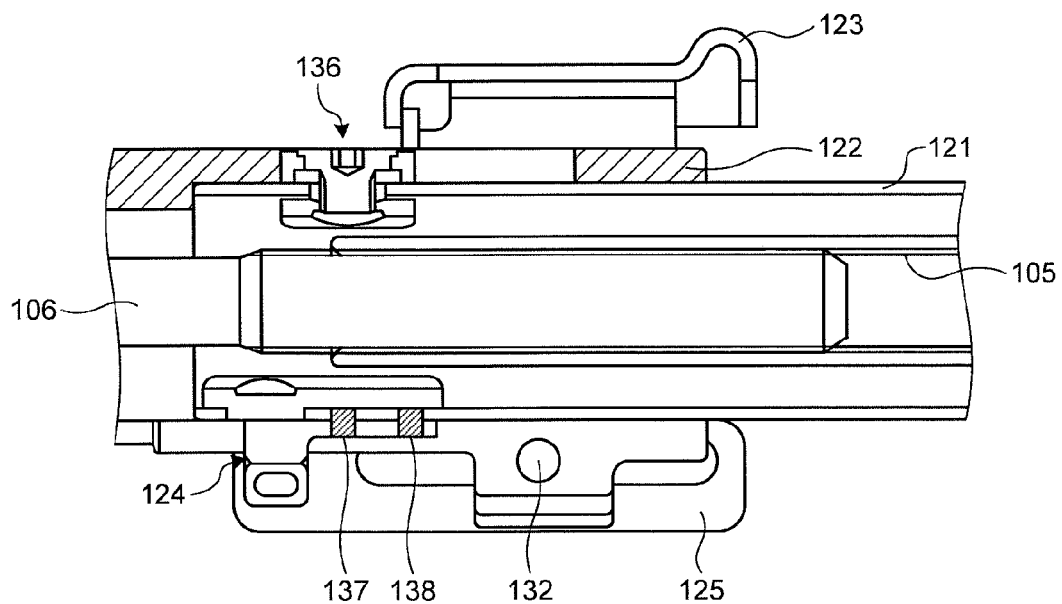
FIG. 7 is an enlarged diagram illustrating a part A of FIG. 5.
Figure 8:
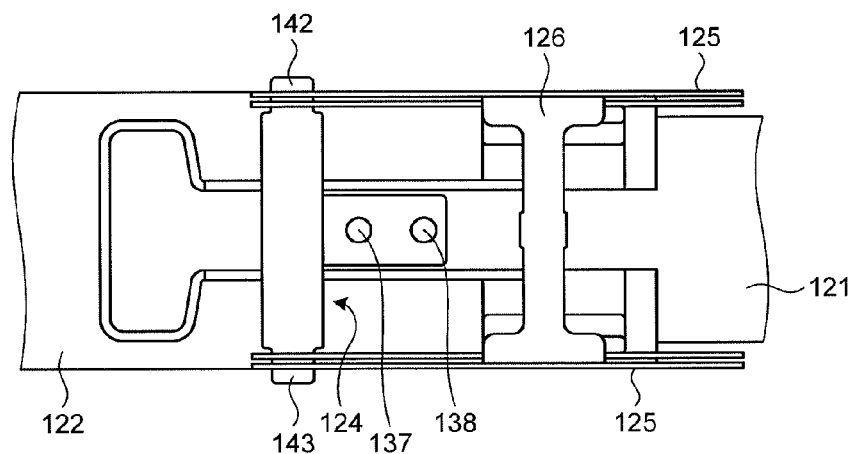
FIG. 8 is a diagram (a bottom view of the steering column apparatus) illustrating a bottom surface of FIG. 7.
Figure 9:
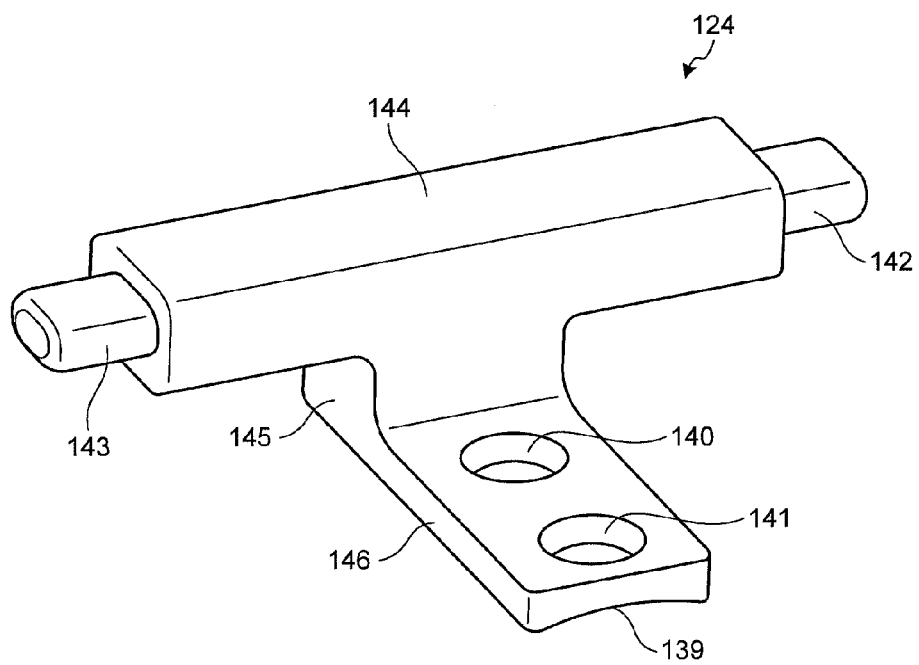
FIG. 9 is a perspective view illustrating a fixed bracket according to the first embodiment.
Figure 10:
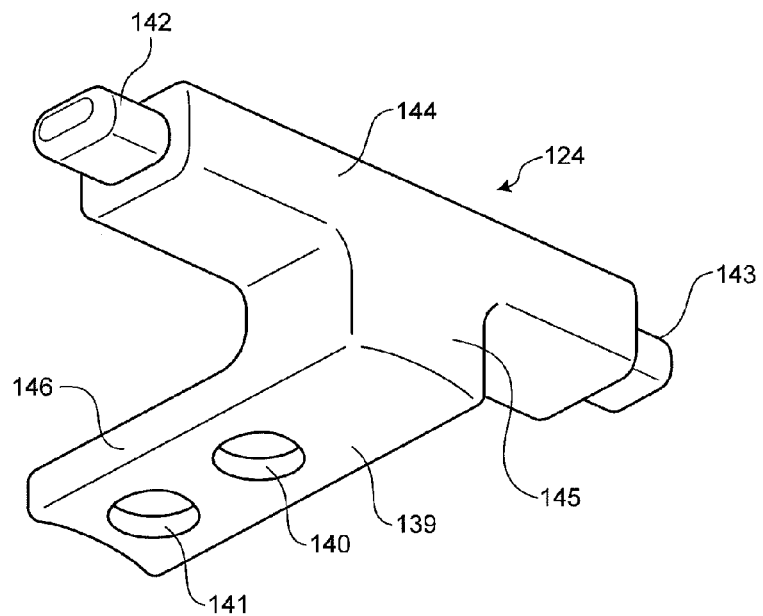
FIG. 10 is a perspective view illustrating the fixed bracket according to the first embodiment.
Figure 11:
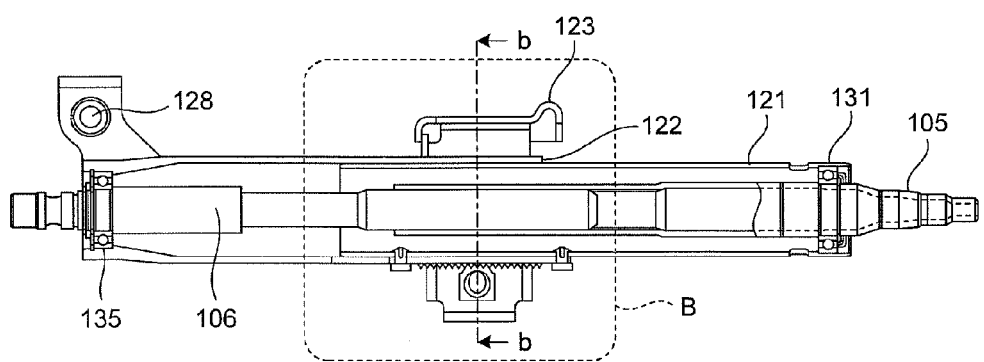
FIG. 11 is a diagram illustrating a side surface (a part of a cross section) of the steering column apparatus of the second embodiment.
Figure 12:
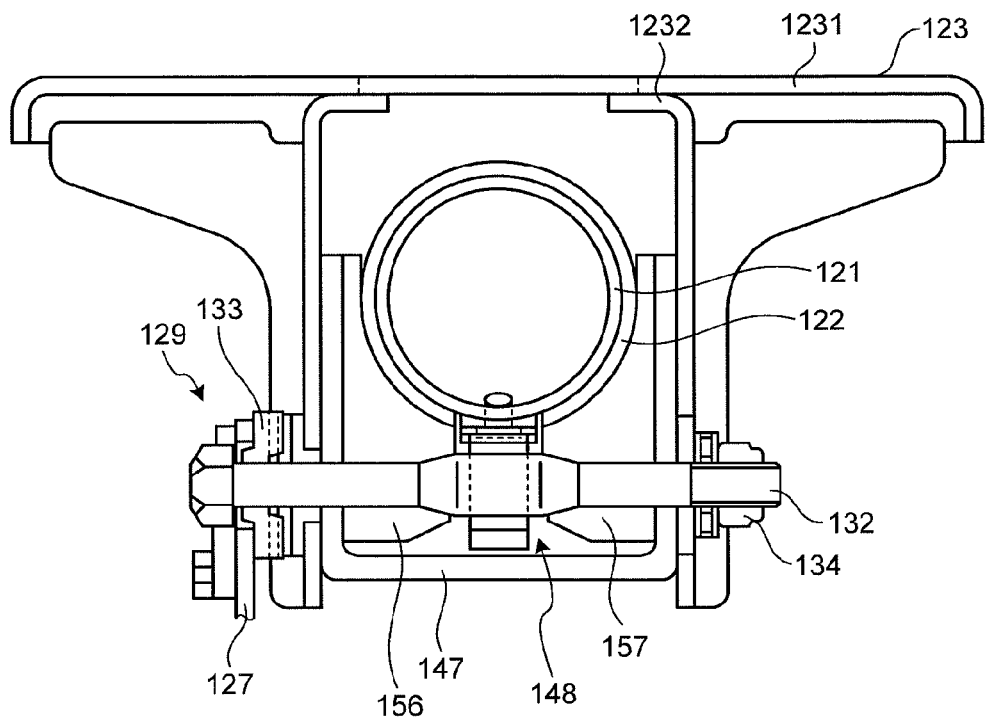
FIG. 12 is a cross-sectional view taken along the line b-b of FIG. 11.
Figure 13:
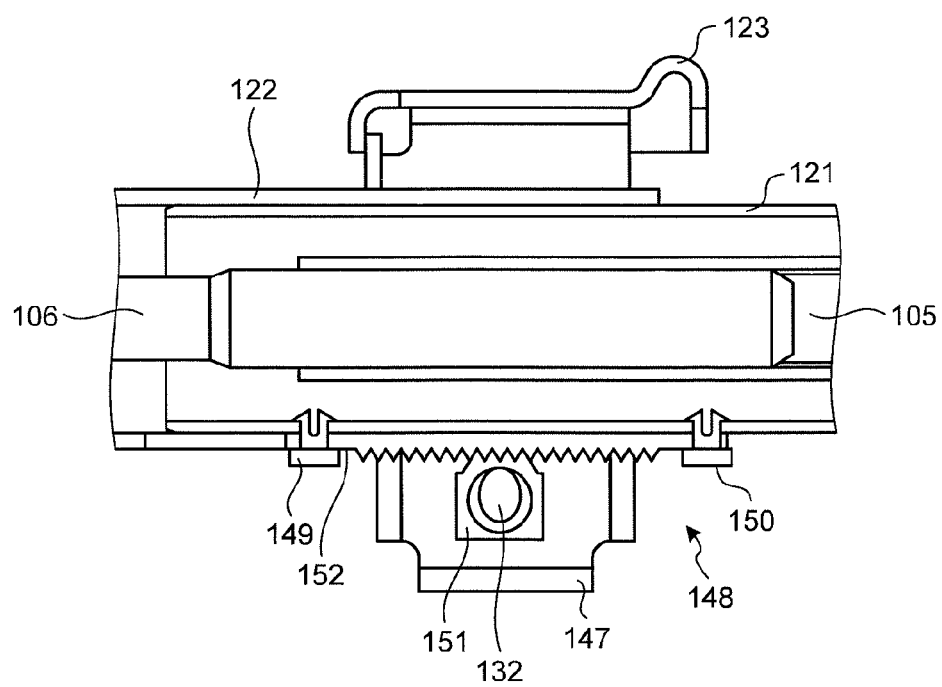
FIG. 13 is an enlarged diagram illustrating a part B of FIG. 11.
Figure 14:
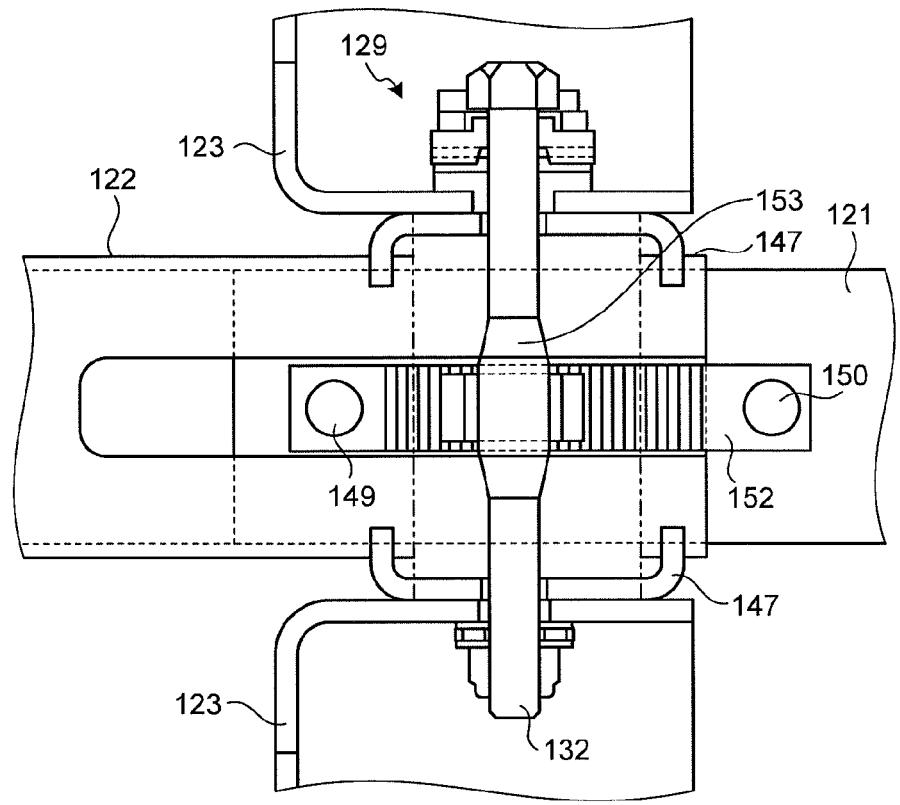
FIG. 14 is a diagram (a bottom view of the steering column apparatus) illustrating a bottom surface of FIG. 11.
Figure 15:
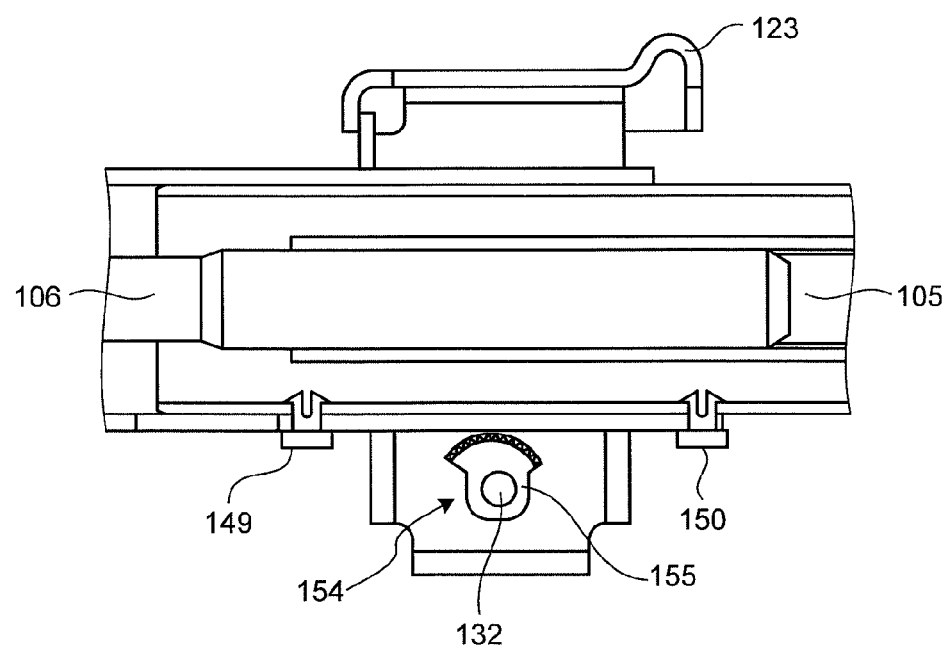
FIG. 15 is a diagram similar to FIG. 13 illustrating a modified example of the second embodiment.
Figure 16:
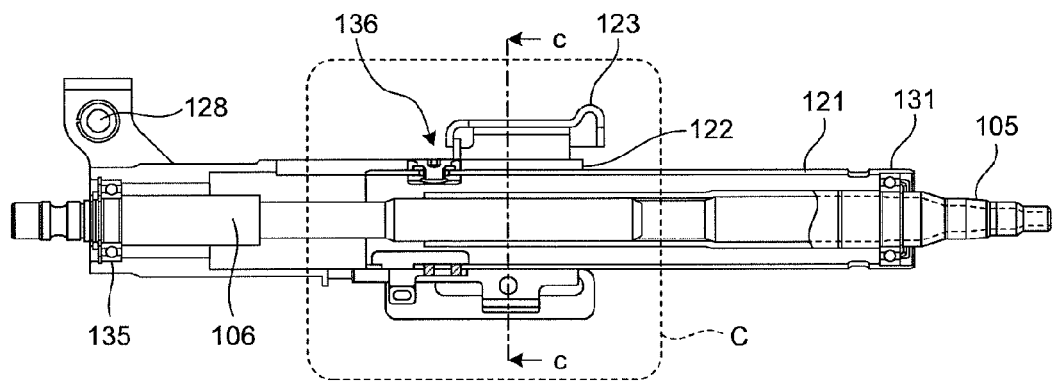
FIG. 16 is a diagram illustrating a side surface (a part of a cross section) of the steering column apparatus of the third embodiment.
Figure 17:
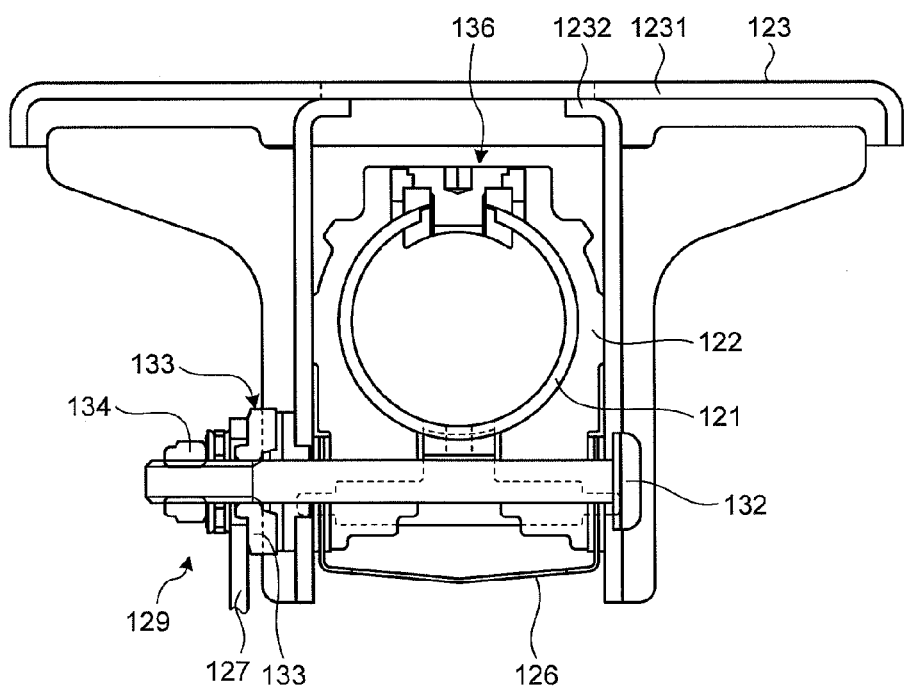
FIG. 17 is a cross-sectional view taken along the line c-c of FIG. 16.
Figure 18:
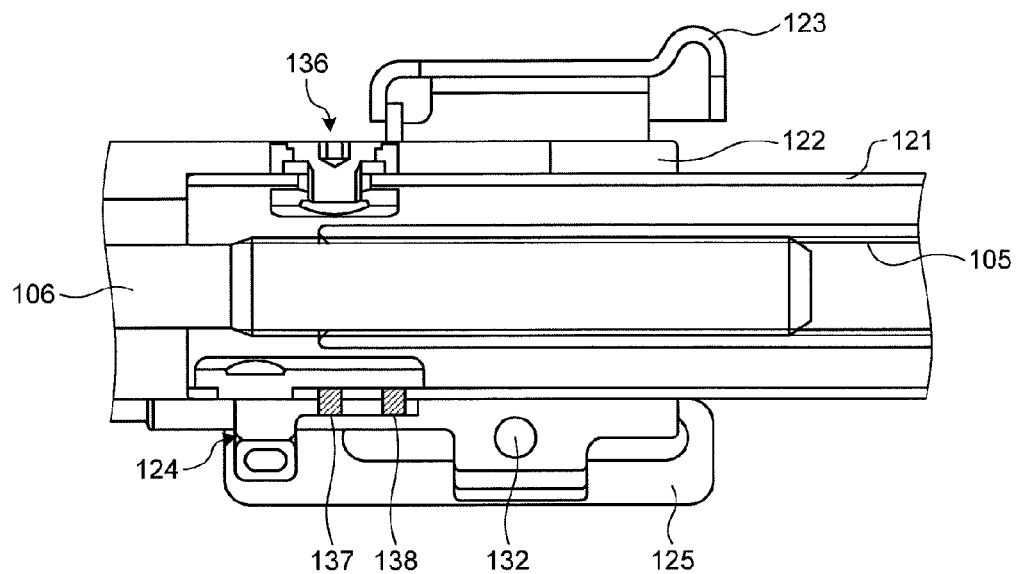
FIG. 18 is an enlarged diagram illustrating a part C of FIG. 16.
Figure 19:
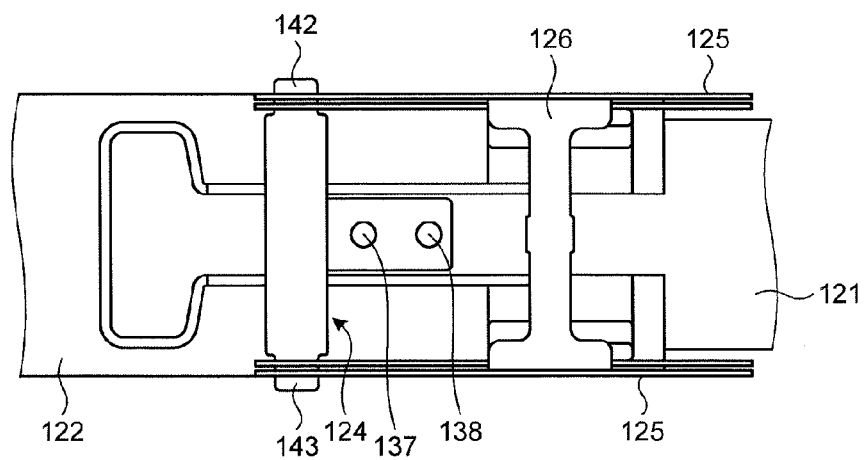
FIG. 19 is a diagram (a bottom view of the steering column apparatus) illustrating a bottom surface of FIG. 16.
Figure 20A:
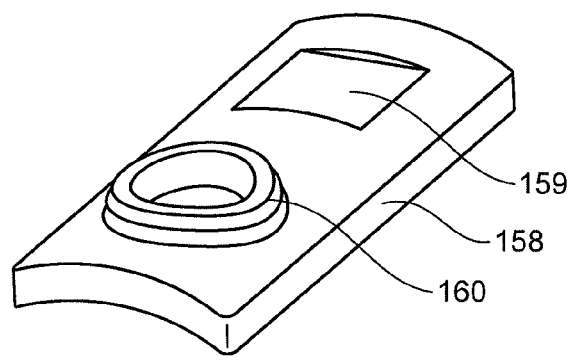
FIGS. 20A and 20B are diagrams illustrating an inner plate according to the third embodiment.
Figure 20B:
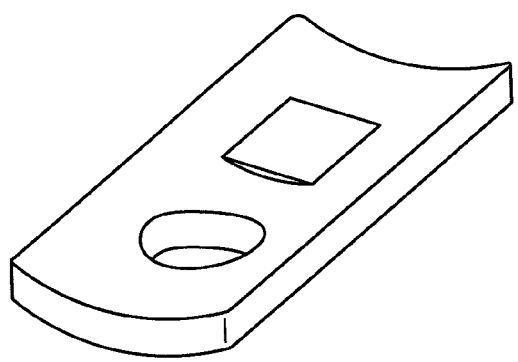
Figure 21A:
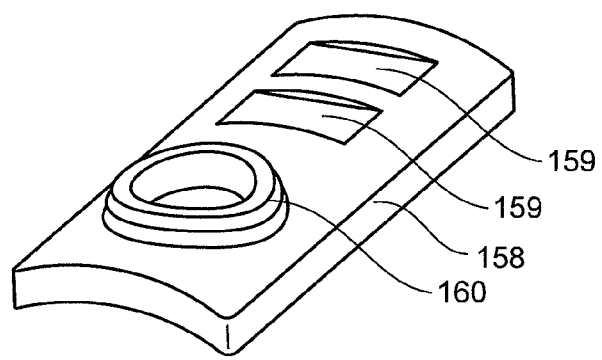
FIGS. 21A and 21B are diagrams illustrating an inner plate according to a modified example of the third embodiment.
Figure 21B:
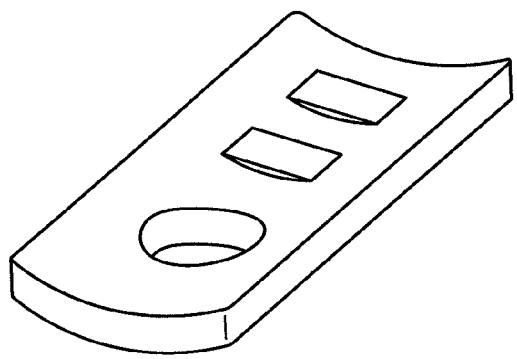
Figure 23A:
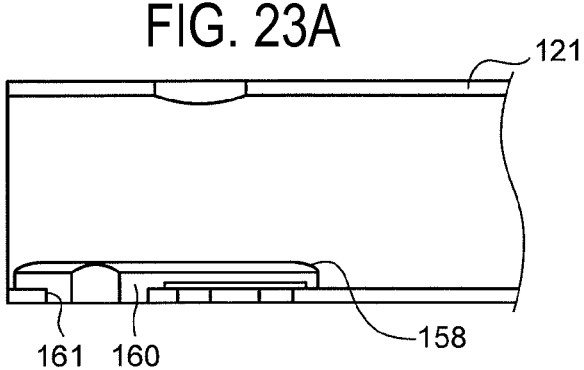
FIGS. 23A-23D are diagrams illustrating an inner plate attachment method according to the third embodiment.
Figure 23B:
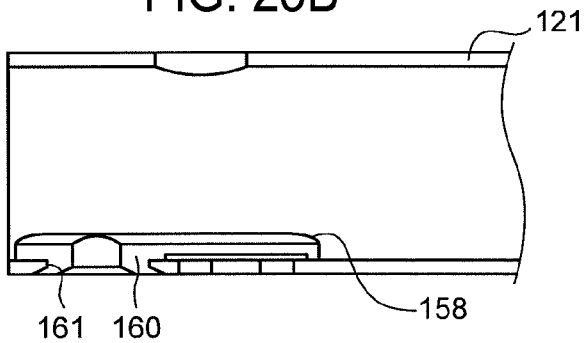
Figure 23C:
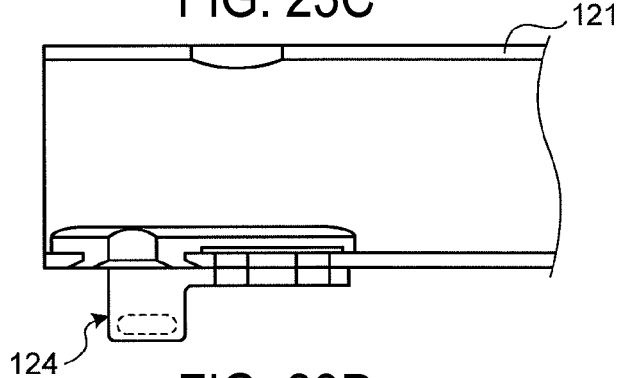
Figure 23D:
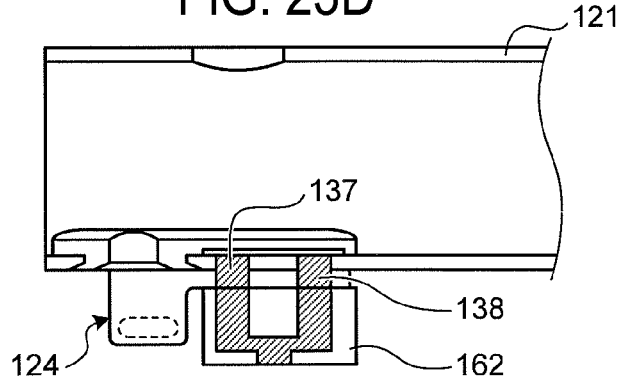

Hereinafter, this structure will be described in detail with reference to FIGS. 1 to 23D. FIGS. 1 to 4 schematically illustrate the first to fourth embodiments. FIGS. 5 to 10 specifically illustrate the structure of the first embodiment. Similarly, FIGS. 11 to 15 specifically illustrate the structure of the second embodiment, and FIGS. 16 to 23D specifically illustrate the structure of the third embodiment. In FIG. 2, the axial direction DA indicates the axial direction of the steering shaft, and the front side DF and the rear side DB indicate the front side and the rear side of the vehicle body when the steering device is attached to the vehicle body.

The first embodiment relates to a steering column apparatus 120 that supports a steering shaft including a male steering shaft 106 and a female steering shaft 105. Here, a steering column includes an inner column 121 and an outer column 122 and is contracted in the axial direction so as to be adjusted in a telescopic manner and to absorb impact. The steering column apparatus 120 may be tilted through a tilt bracket 123 attached to a vehicle body. Then, the outer column 122 is tightened by a tightening mechanism 129 provided in the tilt bracket 123 so as to hold the inner column 121. Here, a telescopic multiplate 125 is provided so as to increase the friction surface of the tightening mechanism 129. Further, the telescopic multiplate 125 is fixed to a fixed bracket 124 provided in a slit of the outer column 122 at the bottom surface side of the columns (121, 122), and a shear pin is inserted through a hole of the inner column 121 and a hole of the fixed bracket 124 while the holes match each other, thereby supporting the inner column 121 detachably from the fixed bracket 124.

The second embodiment relates to the steering column apparatus 120 that supports the steering shaft including the male steering shaft 106 and the female steering shaft 105. Here, the steering column apparatus 120 includes the inner column 121 and the outer column 122 and is contracted in the axial direction so as to be adjusted in a telescopic manner and to absorb impact. Further, the steering column apparatus 120 is attached to the vehicle body through the tilt bracket 123 attached to the vehicle body so as to be tilted. Furthermore, the tilt bracket 123 includes the tightening mechanism 129, and is used to hold the inner column 121 by tightening the outer column 122. The outer column 122 includes a slit, and the inner column 121 is gripped by a pressing bracket 1232 which presses the inner column by the action of the tightening mechanism 129 in the right and left direction of the slit. Furthermore, a cam and gear mechanism 148, serving as a fixed plate detachably attached to the inner column 121, is disposed in the slit. The tightening mechanism 129 is provided with a tilt lever 127, and a rotation of the tilt lever 127 makes a cam lock mechanism 133, which is a cam at the center of the tilt lever 127, rotate to press a cam portion provided in a tilt bolt center portion 153 in a direction from the downside of the fixed plate toward the upside thereof, and support the fixed plate.

The third embodiment relates to a steering column apparatus that supports a steering shaft. Here, the steering column apparatus includes an inner column and an outer column and is contracted in the axial direction so as to be adjusted in a telescopic manner and to absorb impact. The steering column apparatus includes a tilt bracket provided in a vehicle body, and is attached to the vehicle body in a tiltable state. Then, the tilt bracket, the outer column, and a telescopic multiplate as a friction plate are tightened by a tightening mechanism so as to hold the inner column fitted into the outer column. Further, the outer column includes a slit, and the inner column is gripped by a pressing bracket which presses the inner column in the right and left direction of the slit in the tightening mechanism. Furthermore, an inner plate 158 which is a fixed plate as a friction plate detachably attached to the inner column is disposed in the slit, and the fixed plate 158 and the fixed bracket which fixes the friction plate are coupled and fixed to the inner column by shear pins 137 and 138 formed by an injection-molding process.

The fourth embodiment relates to a steering device that includes the steering column apparatus according to any one of the first to third embodiments.

The steering device of the fourth embodiment may be appropriately used as a vehicle steering device.

Fifth Embodiment

Figure 24:
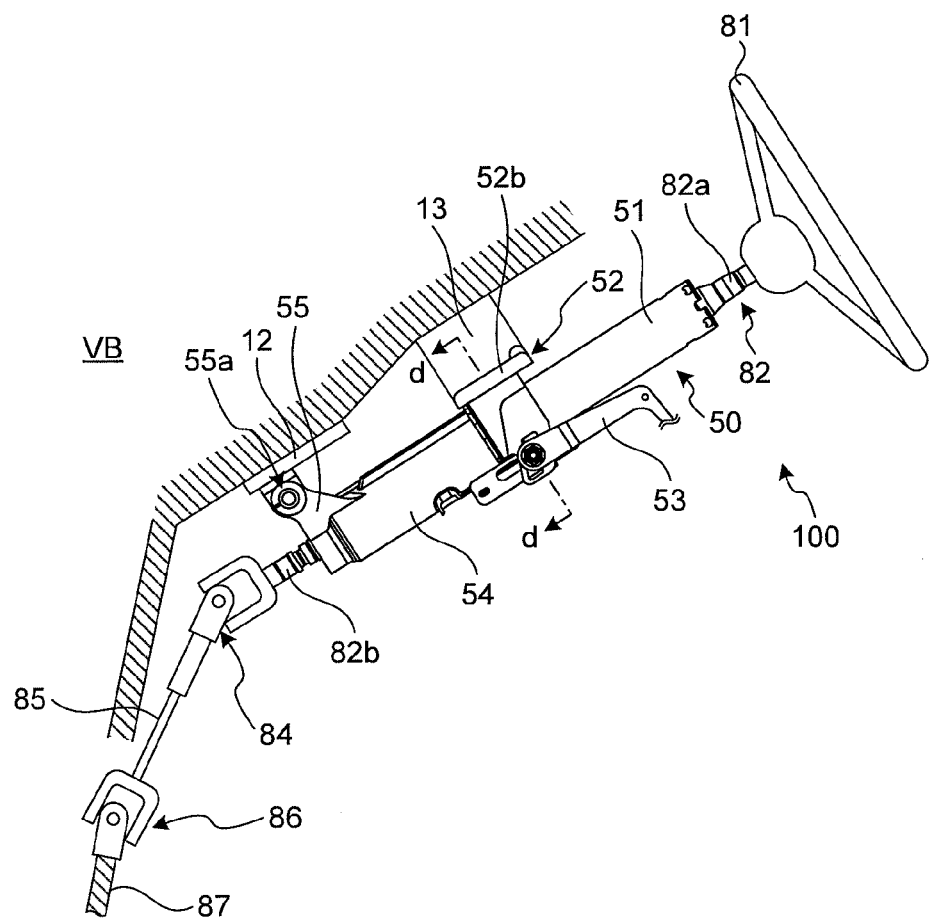
FIG. 24 is a schematic diagram illustrating the periphery of a steering device according to a fifth embodiment.
Figure 25:
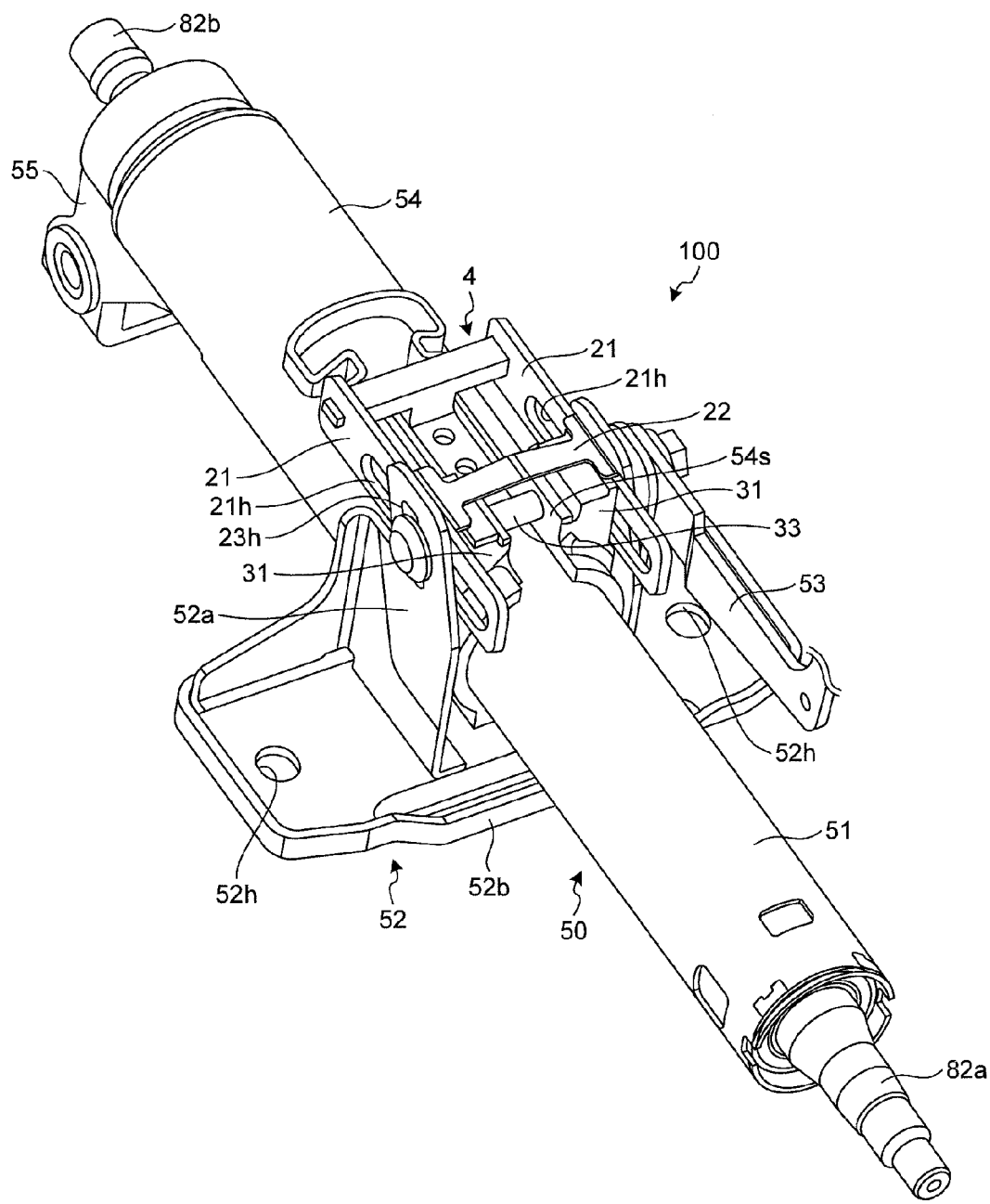
FIG. 25 is a perspective view illustrating the steering device according to the fifth embodiment when viewed from a bottom surface thereof.

FIG. 24 is a schematic diagram illustrating the periphery of a steering device according to a fifth embodiment. FIG. 25 is a perspective view illustrating the steering device according to the fifth embodiment when viewed from the bottom surface thereof. Referring to FIGS. 24 and 25, an outline of the steering device according to the fifth embodiment will be described. Further, in the description below, the front side of a vehicle body VB when a steering device 100 is attached to the vehicle body VB will be simply referred to as the front side and the rear side of the vehicle body VB when the steering device 100 is attached to the vehicle body VB will be simply referred to as the rear side. In FIG. 24, the front side indicates the left side of the drawing, and the rear side indicates the right side of the drawing.

(Steering Device)

The steering device 100 includes a steering wheel 81, a steering shaft 82, a universal joint 84, a lower shaft 85, and a universal joint 86 in order in which a force is transmitted from an operator, and is coupled to a pinion shaft 87.

The steering shaft 82 includes an input shaft 82a and an output shaft 82b. In the input shaft 82a, one end is connected to the steering wheel 81 and the other end is connected to the output shaft 82b. In the output shaft 82b, one end is connected to the input shaft 82a and the other end is connected to the universal joint 84. In the fifth embodiment, the input shaft 82a and the output shaft 82b are formed of general steel such as SPCC (Steel Plate Cold Commercial).

In the lower shaft 85, one end is connected to the universal joint 84 and the other end is connected to the universal joint 86. In the pinion shaft 87, one end is connected to the universal joint 86.

Further, the steering device 100 includes a steering column 50 that includes a cylindrical inner column 51 rotatably supporting the input shaft 82a and a cylindrical outer column 54 into which at least a part of the inner column 51 is inserted. The inner column 51 is disposed at the rear side of the outer column 54. In the description below, the axial direction of the inner column 51 and the axial direction of the outer column 54 will be simply appropriately referred to as the axial direction.

The steering device 100 includes an outer column bracket 52 which is fixed to a vehicle body side member 13 and supports the outer column 54. The outer column bracket 52 includes an attachment plate portion 52b which is fixed to the vehicle body side member 13 and a frame-shaped support portion 52a which is integrated with the attachment plate portion 52b. The attachment plate portion 52b of the outer column bracket 52 includes, for example, an attachment hole 52h, and is fixed to the vehicle body side member 13 by a fixing member such as a bolt and the attachment hole 52h. The frame-shaped support portion 52a of the outer column bracket 52 is disposed at both sides of the outer column 54 so as to tighten the outer column 54. Further, the frame-shaped support portion 52a is provided with a tilt adjustment hole 23h as an elongated hole which is long in the up and down direction of the vehicle body VB.

Further, the outer column 54 includes a pivot bracket 55 which is provided at the front end. The pivot bracket 55 is supported by the vehicle body side member 12 so as to be rotatable about a center of a rotation shaft 55a. The rotation shaft 55a is parallel to, for example, the horizontal direction. Accordingly, the outer column 54 is supported so as to be tilted in the vertical direction.

Figure 26:
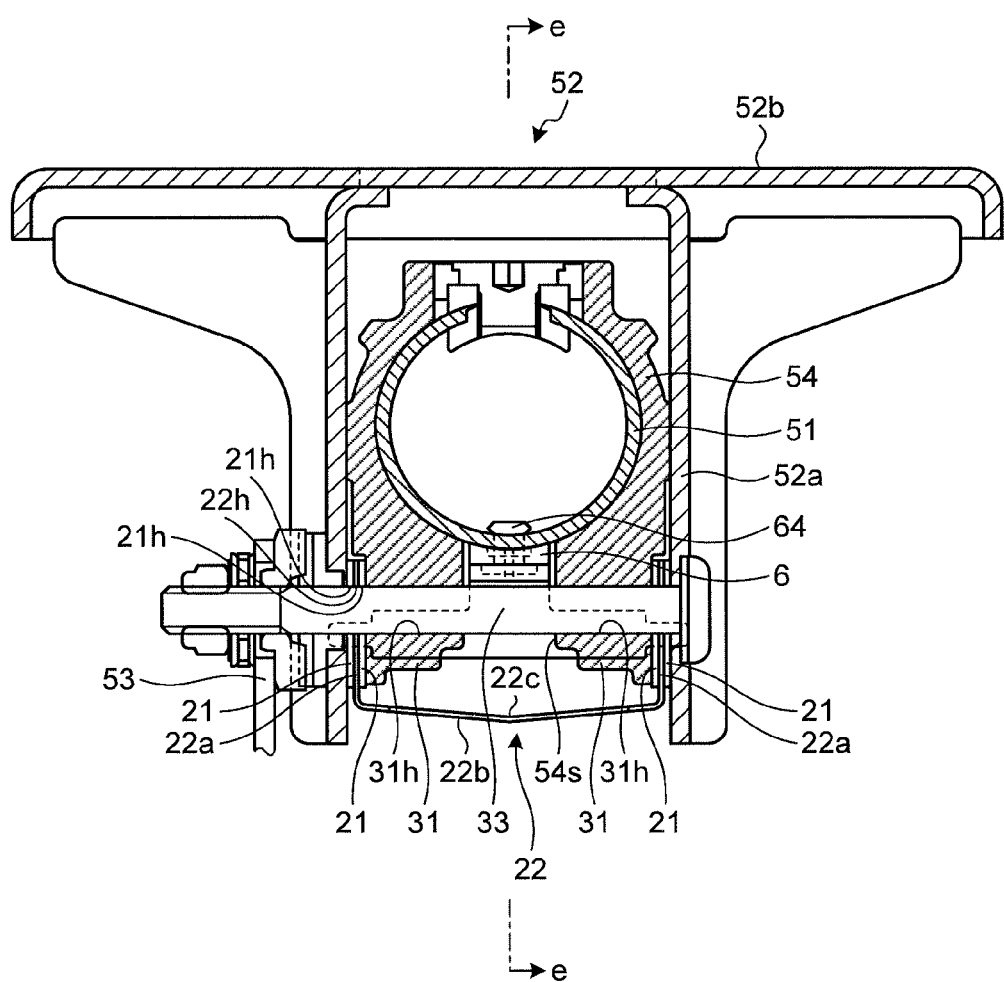
FIG. 26 is a cross-sectional view taken along the line d-d of FIG. 24.
Figure 27:
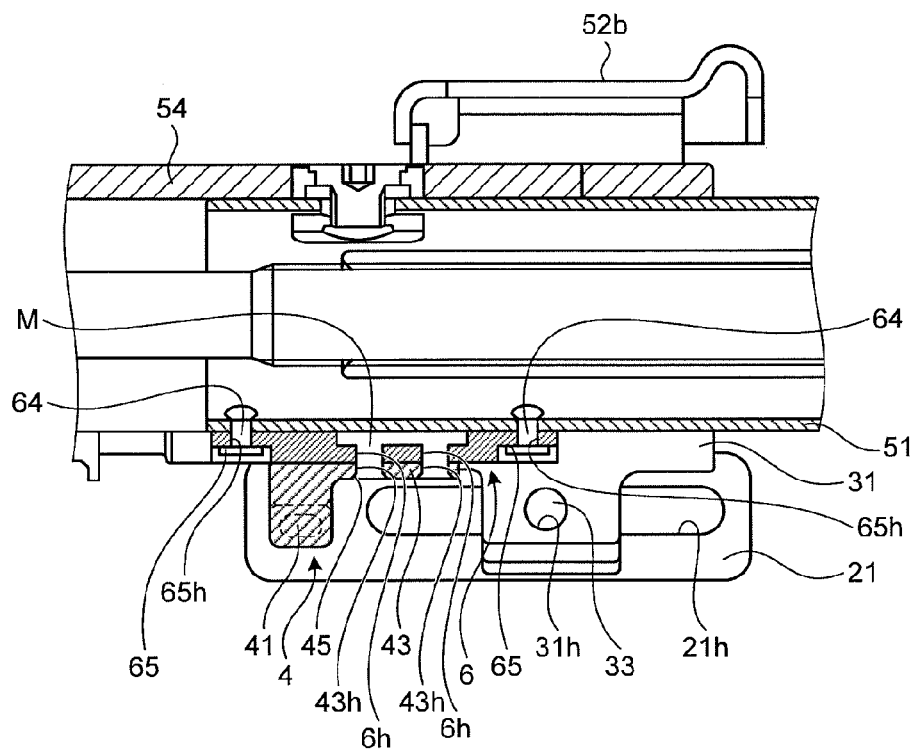
FIG. 27 is a cross-sectional view taken along the line e-e of FIG. 26.
Figure 28:
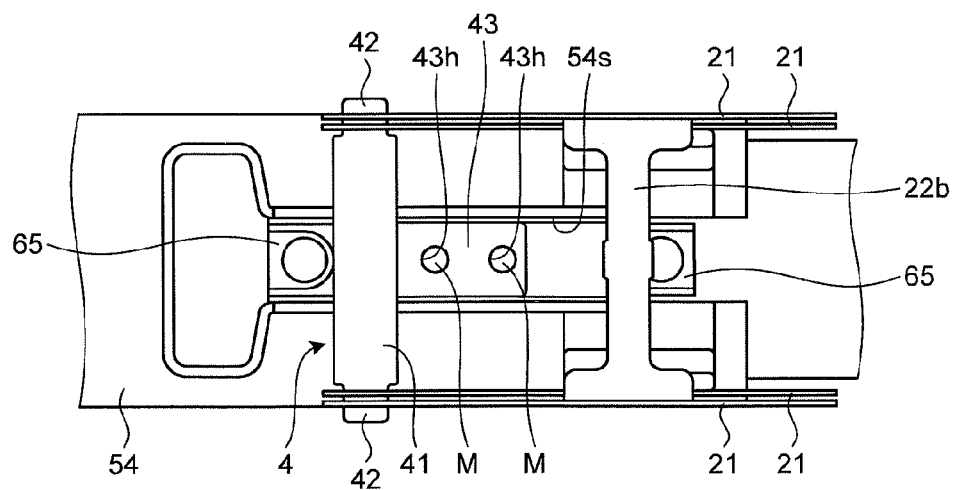
FIG. 28 is a diagram illustrating the bottom surface of the steering device according to the fifth embodiment.

FIG. 26 is a cross-sectional view taken along the line d-d of FIG. 24. FIG. 27 is a cross-sectional view taken along the line e-e of FIG. 26. FIG. 28 is a diagram illustrating the bottom surface of the steering device according to the fifth embodiment. As illustrated in FIG. 26, the outer column 54 includes two rod penetration holes 31 and a slit 54s. The rod penetration hole 31 is a portion which protrudes outward in the radial direction from the outer peripheral surface of the inner column 51, and includes a rod penetration hole 31h as an annular hole as illustrated in FIG. 27. The radial direction indicates a direction perpendicular to the axial direction, and is used as the same meaning in the description below. The rod penetration holes 31h of two rod penetration holes 31 face each other in the radial direction. Further, a part of the rod penetration hole 31 faces the frame-shaped support portion 52a. A rod 33 is connected to a manipulation lever 53 while penetrating two rod penetration holes 31h and the tilt adjustment hole 23h of the frame-shaped support portion 52a.

Further, the slit 54s is an elongated hole which is formed by notching one end of the outer column 54, and is provided in the outer wall of the outer column 54 at a position between two rod penetration holes 31. Since the outer column 54 includes the slit 54s, the inner diameter decreases when the outer column is tightened. Accordingly, in a state where the outer column 54 is tightened, at a portion where the outer column 54 covers the inner column 51, the inner wall of the outer column 54 contacts the outer wall of the inner column 51. For this reason, a friction force is generated between the outer column 54 and the inner column 51. Further, both ends of the slit 54s in the axial direction may be blocked. That is, the slit 54s may be a closed structure.

As illustrated in FIG. 26, the steering device 100 includes a first telescopic friction plate 21 and a second telescopic friction plate 22. The first telescopic friction plate 21 is a plate-shaped member that includes a telescopic adjustment hole 21h as an elongated hole which is long in the axial direction. For example, two first telescopic friction plates 21 are disposed between the frame-shaped support portion 52a and the rod penetration hole 31 in an overlapping state. The second telescopic friction plate 22 is, for example, a member that is formed by bending a plate material, and substantially has a U-shape when viewed from the axial direction. The second telescopic friction plate 22 includes two friction portions 22a which are disposed between two first telescopic friction plates 21, a connection portion 22b which connects two friction portions 22a, and a curved portion 22c which is provided in the connection portion 22b. In addition, the first telescopic friction plate 21 may not be essentially disposed between the frame-shaped support portion 52a and the rod penetration hole 31, and may be disposed with the frame-shaped support portion 52a interposed between the first telescopic friction plate 21 and the rod penetration hole 31.

The friction portion 22a includes a rod penetration hole 22h as an annular hole. The rod 33 penetrates the telescopic adjustment hole 21h and the rod penetration hole 22h. The connection portion 22b is used to integrally connect two friction portions 22a, and hence the friction portions 22a may be easily disposed between two first telescopic friction plates 21. Further, the connection portion 22b may be maintained in a droopy state due to the curved portion 22c. Accordingly, the connection portion 22b may not easily pull the friction portions 22a even when the tightening state of the outer column bracket 52 changes so that the distance between two friction portions 22a changes. For this reason, it is possible to suppress a problem in which the friction portions 22a are pulled by the connection portion 22b so that a gap is formed between the friction portion 22a and the first telescopic friction plate 21.

When the frame-shaped support portion 52a is tightened, the first telescopic friction plate 21 and the friction portion 22a of the second telescopic friction plate 22 are pressed against the rod penetration hole 31 of the outer column 54 by the frame-shaped support portion 52a. Accordingly, a friction force is generated between the frame-shaped support portion 52a and the first telescopic friction plate 21, a friction force is generated between the first telescopic friction plate 21 and the friction portion 22a of the second telescopic friction plate 22, and a friction force is generated between the first telescopic friction plate 21 and the rod penetration hole 31. For this reason, the area causing a friction force increases compared to the case where the first telescopic friction plate 21 and the second telescopic friction plate 22 are not provided. The frame-shaped support portion 52a may more strongly tighten the outer column 54 by the first telescopic friction plate 21 and the second telescopic friction plate 22.

Further, when the manipulation lever 53 is rotated, the tightening force for the frame-shaped support portion 52a may be loosened, and the friction force between the frame-shaped support portion 52a and the outer column 54 disappears or decreases. Accordingly, the tilt position of the outer column 54 may be adjusted. Further, when the manipulation lever 53 is rotated, the tightening force for the frame-shaped support portion 52a may be loosened, and hence the width of the slit 54s of the outer column 54 increases. Accordingly, since the force in which the outer column 54 tightens the inner column 51 disappears, the friction force caused by the sliding of the inner column 51 disappears. Accordingly, an operator may adjust the telescopic position by pressing and pulling the inner column 51 through the steering wheel 81 after rotating the manipulation lever 53.

Figure 29:
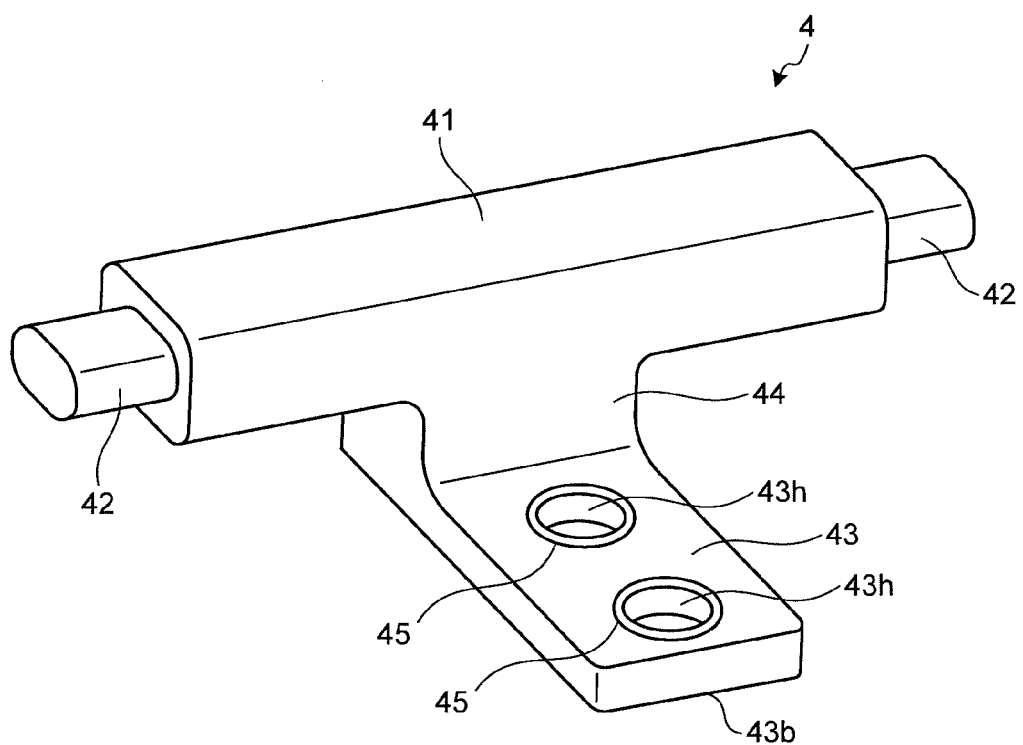
FIG. 29 is a perspective view illustrating an inner column bracket according to the fifth embodiment.

As illustrated in FIGS. 27 and 28, the steering device 100 includes an inner column bracket 4. FIG. 29 is a perspective view illustrating an inner column bracket according to the fifth embodiment. As illustrated in FIG. 29, the inner column bracket 4 includes, for example, an arm portion 41, an insertion portion 42, a neck portion 44, and a leg portion 43. For example, as illustrated in FIG. 28, the arm portion 41 is a rod-shaped portion which connects two first telescopic friction plates 21 facing each other at both sides of the outer column 54. The insertion portion 42 is a portion which is formed at both ends of the arm portion 41 and is inserted into a hole formed in the first telescopic friction plate 21. The insertion portion 42 is thinner than the arm portion 41. The neck portion 44 is a portion which protrudes from a part of the arm portion 41 in a direction perpendicular to the length direction of the arm portion 41. The leg portion 43 is a plate-shaped portion which is provided in the end opposite to the arm portion 41 in the neck portion 44 and contacts a base plate 6. As illustrated in FIG. 29, a base plate side surface 43b that faces the base plate of the leg portion 43 has a flat surface. Further, the leg portion 43 of the inner column bracket 4 includes a front side concave portion 45 which is formed as a recess in the surface opposite to the base plate side surface 43b.

As illustrated in FIG. 28. The inner column bracket 4 is connected to the first telescopic friction plates 21 disposed at both sides of the outer column 54.

The inner column bracket 4 is supported by the first telescopic friction plate 21 in a manner such that the insertion portion 42 is inserted into a hole formed in the first telescopic friction plate 21. Further, the first telescopic friction plates 21 which are disposed at both sides of the outer column 54 face each other with the arm portion 41 of the inner column bracket 4 interposed therebetween. Further, the inner column bracket 4 is connected to the base plate 6 by the leg portion 43.

Figure 30:
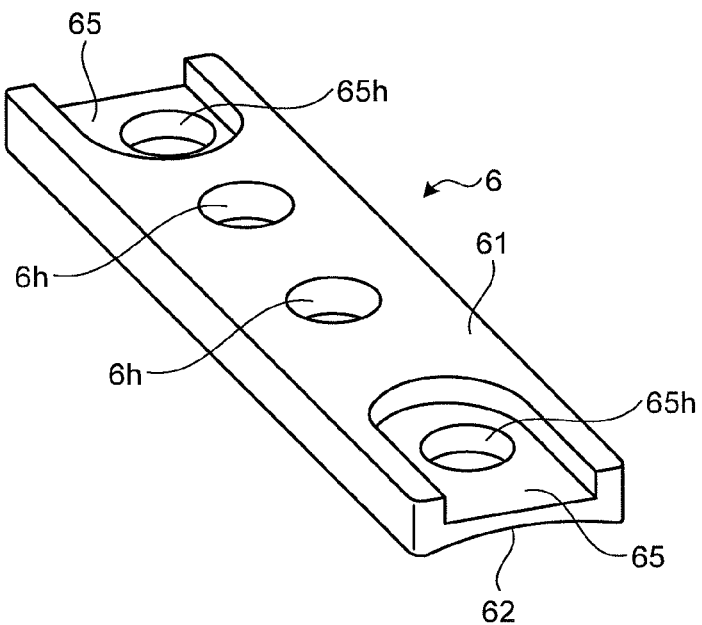
FIG. 30 is a perspective view illustrating a base plate according to the fifth embodiment when viewed from a bracket side surface.
Figure 31:
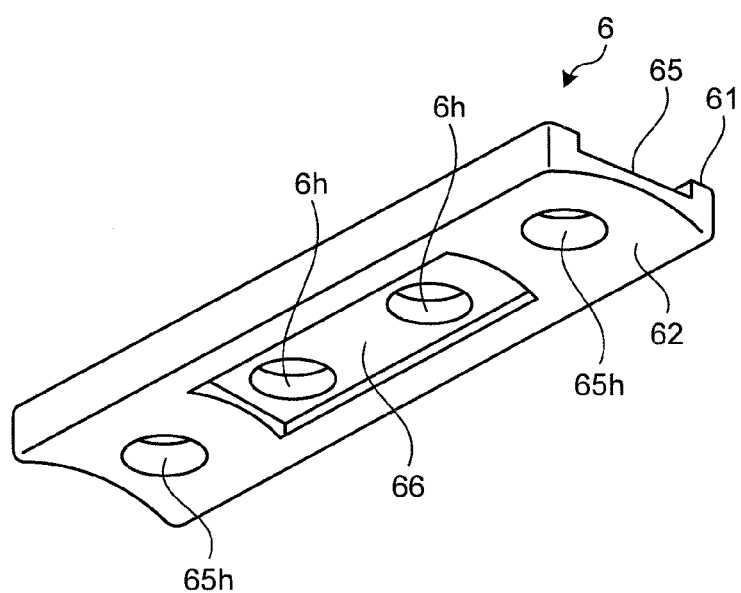
FIG. 31 is a perspective view illustrating the base plate according to the fifth embodiment when viewed from an inner column side surface.

FIG. 30 is a perspective view illustrating a base plate according to a fifth embodiment when viewed from a bracket side surface. FIG. 31 is a perspective view illustrating the base plate according to the fifth embodiment when viewed from an inner column side surface. As illustrated in FIG. 27, the base plate 6 is provided on an outer periphery surface of the inner column 51. As illustrated in FIGS. 30 and 31, the base plate 6 includes a fixing tool concave portion 65 which is formed as a recess in a bracket side surface 61 facing the leg portion 43 of the inner column bracket 4, and a rear side concave portion 66 which is formed as a recess in an inner column side surface 62 facing the inner column 51. The bracket side surface 61 is formed in a flat shape, and the inner column side surface 62 is formed in a shape following the shape of the outer periphery surface of the inner column 51. In a part of the bottom surface of the fixing tool concave portion 65, a fixing tool hole 65h is opened by penetrating an area from the bracket side surface 61 to the inner column side surface 62.

As illustrated in FIG. 27, the base plate 6 is fixed to the inner column 51 by a fixing tool 64 inserted through the fixing tool hole 65h. For example, the fixing tool 64 is a rivet. The fixing tool 64 is inserted from the bracket side surface 61 into the fixing tool hole 65h, and connects the base plate 6 and the inner column 51 to each other while being inserted through the base plate 6 and the inner column 51. The depth of the fixing tool concave portion 65 is larger than the height of the head portion of the fixing tool 64. Accordingly, the head portion of the fixing tool 64 is not easily projected toward the inner column bracket 4 in relation to the bracket side surface 61. For this reason, when the base plate 6 moves in the axial direction, the head portion of the fixing tool 64 does not easily contact the inner column bracket 4. Thus, the movement of the base plate 6 in the axial direction is not easily disturbed. In addition, the fixing tool 64 may be a screw member such as a bolt.

In order to detachably connect the base plate 6 and the inner column bracket 4 to each other, a first hole 6h is opened in the base plate 6 and a second hole 43h is opened in the inner column bracket 4 as illustrated in FIG. 27. As illustrated in FIG. 31, the first hole 6h is opened in at least a part of the bottom surface of the rear side concave portion 66. As illustrated in FIG. 29, the second hole 43h is opened in at least a part of the bottom surface of the front side concave portion 45. The first hole 6h and the second hole 43h communicate with each other. For example, in the fifth embodiment, two first holes 6h and two second holes 43h are provided respectively. When a connection member M is inserted into a position straddling the first hole 6h and the second hole 43h, the leg portion 43 of the inner column bracket 4 is detachably connected to the base plate 6. Further, the first hole 6h and the second hole 43h are disposed at a position where the distance values from the first telescopic friction plates 21 disposed at both sides of the outer column 54 are equal to each other.

In addition, the front side concave portion 45 and the rear side concave portion 66 may not be provided or only one of them may be provided. When the front side concave portion 45 is not provided, the second hole 43h is opened so as to penetrate an area from a surface opposite to the base plate side surface 43b to the base plate side surface 43b. When the rear side concave portion 66 is not provided, the first hole 6h is opened so as to penetrate an area from the inner column side surface 62 to the bracket side surface 61.

Further, the base plate 6 is disposed so that at least a part thereof is fitted to the slit 54s of the outer column 54. Specifically, the base plate 6 is fitted so that the side surface thereof faces the inner wall of the slit 54s.

In the fifth embodiment, the connection member M is a resinous member and is formed of, for example, polyacetal. When the connection member M as a resinous member is injected and fixed into a position straddling the first hole 6h and the second hole 43h, the inner column bracket 4 and the base plate 6 are connected to each other. In the fifth embodiment, the inner column bracket 4 and the base plate 6 may be assembled to the inner column 51 while being connected to each other in advance.

In the case where the inner column bracket 4 and the base plate 6 are connected to each other, the connection member M is injected into the first hole 6h and the second hole 43h while the first hole 6h and the second hole 43h communicate with each other. The injected connection member M is solidified after the connection member is injected into the front side concave portion 45, the second hole 43h, the first hole 6h, and the rear side concave portion 66. Accordingly, since the connection member M solidified in the front side concave portion 45 and the rear side concave portion 66 is fixed so as not to be separable or detachable, it is possible to suppress a problem in which the connection member M comes off from the first hole 6h and the second hole 43h. For this reason, it is possible to suppress a problem in which the inner column bracket 4 and the base plate 6 connected to each other in advance are detached from each other.

In addition, since the connection member M solidified in the front side concave portion 45 or in the rear side concave portion 66 function as the prevention of the separation or detachment, even when any one of the front side concave portion 45 and the rear side concave portion 66 is not provided, it is possible to suppress a problem in which the connection member M comes off from the first hole 6h and the second hole 43h.

In the steering device 100 according to the fifth embodiment, the inner column bracket 4 and the base plate 6 are connected to each other in advance by the connection member M, it is possible to omit an operation in which the connection member M is injected and solidified in the entire attachment operation for the steering device 100. Thus, it is possible to more simplify the attachment operation in the steering device 100 according to the fifth embodiment.

When an excessive load is applied to the steering wheel 81, the load is transmitted to the inner column 51 through the input shaft 82a, and hence the inner column 51 is moved forward. When the inner column 51 moves, the base plate 6 which is fixed through the fixing tool 64 moves forward together. Meanwhile, the inner column bracket 4 which is supported by the first telescopic friction plate 21 does not move. For this reason, since a shear force is applied to the connection member M, the connection member M is cut when the load applied from the steering wheel 81 exceeds the allowable shear force of the connection member M. Further, the allowable shear force of the connection member M is set to be smaller than the allowable shear force of the fixing tool 64. Accordingly, it is possible to suppress a problem in which the fixing tool 64 is cut before the connection member M is cut. When the connection member M is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. Thus, when an excessive load is applied to the steering wheel due to the collision of the operator against the steering wheel 81, a force for moving the inner column 51 decreases immediately after the excessive load is applied to the steering wheel, and hence impact is absorbed.

Further, even when the connection member M is cut, the outer column 54 is supported by the outer column bracket 52 fixed to the vehicle body side member 13. Further, the inner column 51 is supported by the outer column 54. For this reason, even when the connection member M is cut, the steering column 50 does not drop.

Further, it is desirable that the inner column 51 move straightly in the axial direction after the connection member M is cut. When the movement direction of the inner column 51 forms an angle with respect to the axial direction of the outer column 54, the movement of the inner column 51 may be easily disturbed or a friction force generated between the inner column 51 and the outer column 54 may become larger than a predetermined value.

In the fifth embodiment, as illustrated in FIG. 28, the inner column bracket 4 is bonded to the first telescopic friction plates 21 disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the connection member M is cut. Thus, when the inner column starts to move, the posture of the inner column 51 may be easily maintained so as to be straight in the axial direction. Accordingly, the inner column 51 moves straight in the axial direction.

Further, the first hole 6h and the second hole 43h are disposed at a position where the distance values from the first telescopic friction plates 21, which are disposed at both sides with the inner column bracket 4 interposed therebetween, are equal to each other. Accordingly, when an axial load is applied to the inner column bracket 4, a more stable tightening force is applied from both sides of the outer column 54 to the inner column bracket 4. Accordingly, it is possible to stabilize the posture of the inner column bracket 4 when the connection member M is cut. Thus, it is possible to easily maintain the posture in which the inner column 51 starts to move so as to be straighter in the axial direction. Thus, the inner column 51 may move straighter in the axial direction.

Further, even when the inner column bracket 4 may not receive a stable tightening force from both sides of the outer column 54, since the base plate 6 is fitted into the slit so as to face the inner wall of the slit 54s, the base plate 6 is guided by the slit 54s in the axial direction. Accordingly, it is possible to stabilize the posture of the inner column bracket 4 when the connection member M is cut.

In addition, the allowable shear force of the connection member M may be adjusted by changing the number of the first holes 6h and the second holes 43h, the cross-sectional areas of the first hole 6h and the second hole 43h, and the material of the connection member M. For example, the number of set of the first hole 6*h* and the second hole 43*h* may be one or three or more. Further, the connection member M may be formed of, for example, metal including non-ferrous metal, adhesive or rubber.

Figure 32:
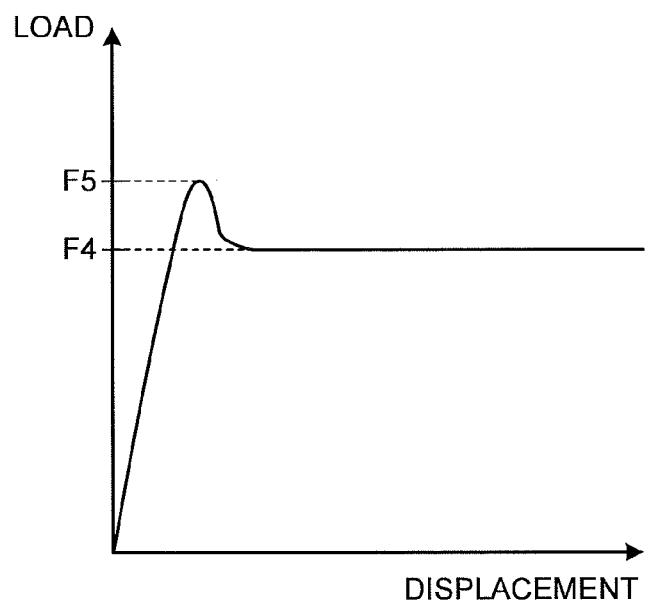
FIG. 32 is a diagram illustrating a relation between a displacement amount of a steering column and a load necessary to move the steering column of a comparative example.
Figure 33:
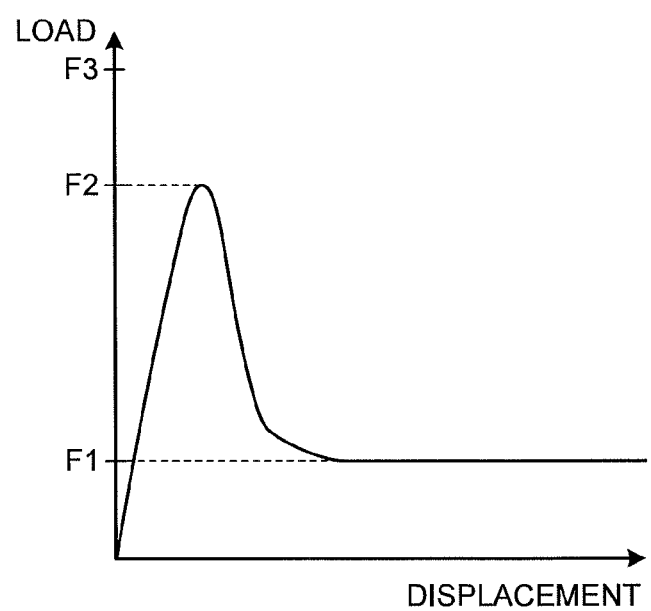
FIG. 33 is a diagram illustrating a relation between a displacement amount of the steering column and a load necessary to move the steering column of the fifth embodiment.

FIG. 32 is a diagram illustrating a relation between a displacement amount of a steering column and a load necessary to move the steering column of a comparative example. FIG. 33 is a diagram illustrating a relation between a displacement amount of the steering column and a load necessary to move the steering column of the fifth embodiment. In FIGS. 32 and 33, the horizontal axis indicates the forward displacement amount of the steering column, and the vertical axis indicates the load necessary to move the steering column forward.

The comparative example is an example in the case where the outer column is attached to the vehicle body through the capsule as in the technique disclosed in Prior Art 1. In the comparative example, the outer column is disposed at the rear side in relation to the inner column. Then, when an excessive load is applied to the outer column, the rod contacts the end of the telescopic adjustment hole integrated with the outer column, and then the load is transmitted to the capsule through the bracket. A force F5 illustrated in FIG. 32 indicates the allowable shear force of the capsule.

In the comparative example, the outer column is supported in the axial direction by a friction force generated between the inner column and the outer column due to the tightening of the bracket. A force F4 illustrated in FIG. 32 indicates the friction force that supports the outer column. The force F4 is smaller than the force F5. In order to prevent the movement of the outer column by the load applied in normal use, the force F4 needs to be maintained at a predetermined value or more.

In the comparative example, when a load of the force F5 or more is applied to the outer column, the capsule is cut and the outer column is detached from the vehicle body. Subsequently, the outer column moves in the axial direction while absorbing an impact by a friction force with the inner column. However, since the force F4 is maintained at a predetermined value or more as described above, the outer column moves smoothly, and hence the operator may not be easily protected from the secondary collision.

Meanwhile, in the fifth embodiment, the inner column 51 is supported in the axial direction by a first friction force, which is generated between the inner column and the outer column 54 by the tightening of the outer column bracket 52, and a second friction force, which is generated between the first telescopic friction plate 21 and the member (the outer column bracket 52, the second telescopic friction plate 22, and the outer column 54) contacting the first telescopic friction plate 21. The force F1 illustrated in FIG. 33 indicates the first friction force, and the force F3 indicates the sum of the first friction force and the second friction force. Further, the force F2 illustrated in FIG. 33 indicates the allowable shear force of the connection member M. The force F2 is smaller than the force F3 and is larger than the force F1.

In the fifth embodiment, when a load of the force F2 or more is applied to the inner column 51, the connection member M is cut and the inner column 51 is detached from the inner column bracket 4. Accordingly, since the connection between the inner column 51 and the first telescopic friction plate 21 is released, the second friction force is not applied to the inner column 51. For this reason, the inner column 51 moves in the axial direction while absorbing an impact by the first friction force after the connection member M is cut. In the steering device 100 according to the fifth embodiment, when the first friction force is set to be small, the inner column 51 moves smoothly, and hence the operator may be easily protected from the secondary collision.

In the fifth embodiment, even when the setting value of the first friction force is small, the second friction force may compensate a degree in which the first friction force decreases among the force supporting the inner column 51 in the axial direction. For this reason, since the steering device 100 according to the fifth embodiment adjusts the setting value of the first friction force and the setting value of the second friction force, it is possible to suppress the inner column 51 from moving by the load applied in normal use, and to protect the operator from the secondary collision more easily.

As described above, the steering device 100, according to the fifth embodiment, includes the cylindrical inner column 51 which rotatably supports the input shaft 82*a* connected to the steering wheel 81, the base plate 6 which is provided on an outer periphery surface of the inner column 51 and has the first hole 6*h* opened therein, and the outer column 54 which has a cylindrical shape so that at least a part of the inner column 51 is inserted thereinto and includes the slit 54*s* formed by notching one insertion side end of the inner column 51. Further, the steering device 100 includes the outer column bracket 52 which is fixed to the vehicle body side member 13 so as to support the outer column 54 and tightens the outer column 54 along with the telescopic friction plate (the first telescopic friction plate 21) having a plate shape. Further, the steering device 100 includes the inner column bracket 4 which is supported by the telescopic friction plate (the first telescopic friction plate 21) and in which the second hole 43*h* is opened. Further, the steering device 100 includes the connection member M which detachably connects the inner column 51 and the inner column bracket 4 to each other at a position straddling the first hole 6*h* and the second hole 43*h*.

Accordingly, in the steering device 100 according to the fifth embodiment, when an excessive load is applied to the steering wheel 81, the applied load is transmitted to the inner column 51 through the input shaft 82*a* so as to move the inner column 51 forward. When the inner column 51 moves, the base plate 6 which is fixed through the fixing tool 64 also moves forward. Meanwhile, the inner column bracket 4 which is supported by the first telescopic friction plate 21 does not move. For this reason, since a shear force is applied to the connection member M, the connection member M is cut when the load applied from the steering wheel 81 exceeds the allowable shear force of the connection member M. When the connection member M is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 may move toward the front side of the vehicle body. Further, even when the connection member M is cut, the outer column 54 is supported by the outer column bracket 52 fixed to the vehicle body side member 13. Further, the inner column 51 is supported by the outer column 54. For this reason, even when the connection member M is cut, the steering column 50 is not dropped. Thus, the steering device 100 according to the fifth embodiment may suppress a problem where the steering column 50 is dropped by an erroneous operation, even when decreasing the setting value (the allowable shear force of the connection member M) of the separation load in which the steering column 50 moves toward the front side of the vehicle body.

Further, in the steering device 100 according to the fifth embodiment, the inner column bracket 4 includes the front side concave portion 45, which is a recess, in the surface opposite to the base plate side surface 43b facing the base plate 6, and the second hole 43h is opened in at least a part of the bottom surface of the front side concave portion 45. Further, the connection member M is a resinous member that is injected into the first hole 6h, the second hole 43h, and the front side concave portion 45. Accordingly, since the separation of the connection member M solidified in the front side concave portion 45 is prevented, it is possible to suppress a problem in which the connection member M comes off from the first hole 6h and the second hole 43h. Thus, the steering device 100 according to the fifth embodiment may suppress a problem in which the inner column bracket 4 and the base plate 6 connected to each other are detached from each other.

Further, in the steering device 100 according to the fifth embodiment, the base plate 6 includes the rear side concave portion 66, which is a recess, in the inner column side surface 62 facing the inner column 51, and the first hole 6h is opened in at least a part of the bottom surface of the rear side concave portion 66. Further, the connection member M is a resinous member that is injected into the first hole 6h, the second hole 43h, and the rear side concave portion 66. Accordingly, since the separation of the connection member M solidified in the rear side concave portion 66 is prevented, it is possible to suppress a problem in which the connection member M comes off from the first hole 6h and the second hole 4h. Thus, the steering device 100 according to the fifth embodiment may suppress a problem in which the inner column bracket 4 and the base plate 6 connected to each other are detached from each other.

Further, in the steering device 100 according to the fifth embodiment, the base plate 6 includes the fixing tool concave portion 65, which is a recess, in the bracket side surface 61 facing the inner column bracket 4. Here, the fixing tool hole 65h as a penetration hole is opened in a part of the bottom surface of the fixing tool concave portion 65, and the fixing tool 64 connecting the base plate 6 and the inner column bracket 4 to each other is inserted into the fixing tool hole 65h. Accordingly, the head portion of the fixing tool 64 is not easily projected toward the inner column bracket 4 in relation to the bracket side surface 61. For this reason, when the base plate 6 moves in the axial direction, the head portion of the fixing tool 64 does not easily contact the inner column bracket 4. Thus, the steering device 100 according to the fifth embodiment may suppress a problem in which the movement of the base plate 6 in the axial direction is disturbed by the inner column bracket 4.

Modified Example of Fifth Embodiment

Figure 34:
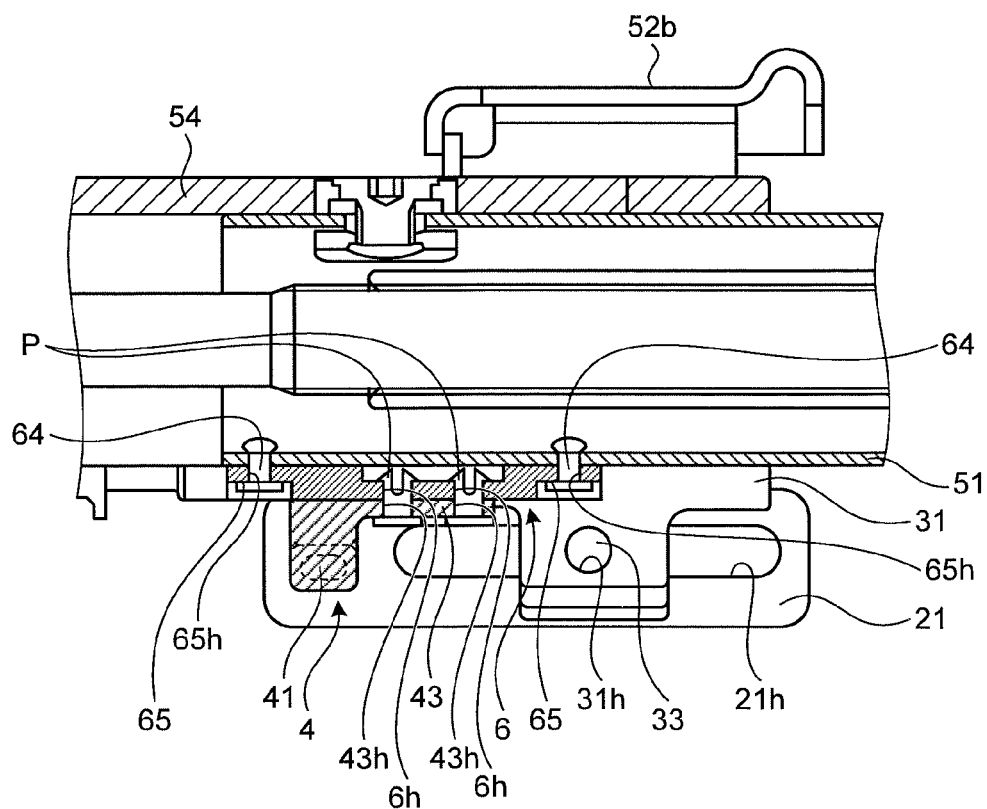
FIG. 34 is a cross-sectional view illustrating the steering device according to the modified example of the fifth embodiment when taken along the line corresponding to the line e-e of FIG. 26.
Figure 35:
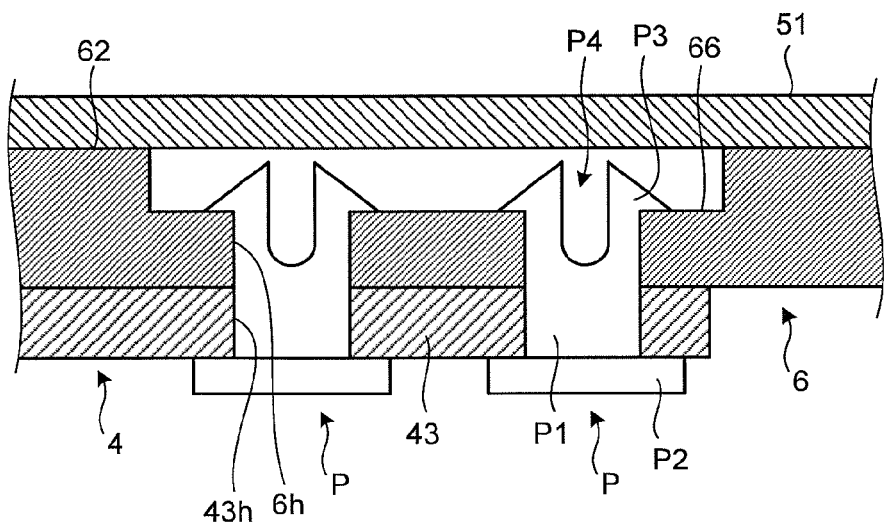
FIG. 35 is an enlarged diagram illustrating the periphery of a connection member of FIG. 34.
Figure 36:
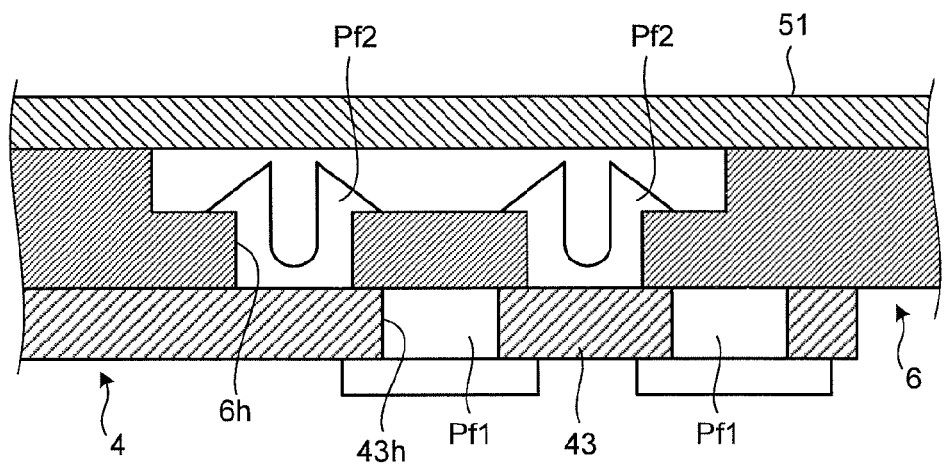
FIG. 36 is a diagram illustrating a state after a connection member according to the modified example of the fifth embodiment is sheared.

FIG. 34 is a cross-sectional view illustrating a steering device according to a modified example of the fifth embodiment when taken along the line corresponding to the line e-e of FIG. 26. FIG. 35 is an enlarged diagram illustrating the periphery of the connection member of FIG. 34. FIG. 36 is a diagram illustrating a state after the connection member according to the modified example of the fifth embodiment is sheared. The steering device 100 according to the modified example of the fifth embodiment is different from that of the fifth embodiment in that a connection member P is a resinous pin. In addition, the same reference signs will be given to the same components as those of the above-described embodiments, and the repetitive description thereof will not be presented.

As illustrated in FIGS. 34 and 35, when the connection member P is inserted into a position straddling the first hole 6h and the second hole 43h, the leg portion 43 of the inner column bracket 4 and the base plate 6 are detachably connected to each other. The inner column bracket 4 and the base plate 6 are assembled in advance, and the inner column bracket 4 and the base plate 6 as assembled are connected to the inner column 51. In addition, as illustrated in FIGS. 34 and 35, the leg portion 43 of the inner column bracket 4 may not include the front side concave portion 45 illustrated in the fifth embodiment.

In the modified example of the fifth embodiment, the connection member P is a resinous pin and is formed of, for example, polyacetal. Further, as illustrated in FIG. 35, the connection member P includes a main body portion P1, a head portion P2 which is provided at one end of the main body portion P1, and a hook portion P3 which is provided at the other end of the main body portion P1. The main body portion P1 is inserted through the first hole 6h and the second hole 43h, and faces the inner walls of the first hole 6h and the second hole 43h. For example, the diameter of the main body portion P1 is substantially equal to the inner diameter of each of the first hole 6h and the second hole 43h. The head portion P2 and the hook portion P3 are disposed outside the first hole 6h and the second hole 43h. The head portion P2 has, for example, a disk shape. The outer periphery of the head portion P2 is larger than the inner periphery of each of the first hole 6h and the second hole 43h. The head portion P2 contacts, for example, the surface of the leg portion 43. The hook portion P3 substantially has, for example, a conical shape of which the outer periphery decreases toward the end of the connection member P. The maximum diameter of the hook portion P3 is larger than the inner diameter of each of the first hole 6h and the second hole 43h. The hook portion P3 contacts, for example, the bottom surface of the rear side concave portion 66. Further, the connection member P includes a slot P4 which is formed from the hook portion P3 toward the head portion P2. In addition, the connection member P may be disposed so that the head portion P2 contacts the bottom surface of the rear side concave portion 66.

While the first hole 6h and the second hole 43h are set to communicate with each other, the resinous pin is inserted into the first hole 6h and the second hole 43h, to connect the inner column bracket 4 and the base plate 6. When compared to the operation of injecting and solidifying the resinous member, an operation of inserting the resinous pin may be performed in a short time since the solidification time is not needed. For this reason, the steering device 100 according to the modified example of the fifth embodiment may easily connect the inner column bracket 4 and the base plate 6 to each other.

Since the connection member P includes the slot P4, the hook portion P3 may be easily elastically deformed when the hook portion is inserted inward from the outer periphery. When the connection member P is inserted from the end near the hook portion P3 into the first hole 6h and the second hole 43h, the hook portion P3 is elastically deformed while contacting the inner walls of the first hole 6h and the second hole 43h. When the hook portion P3 reaches the outside while passing through the first hole 6h and the second hole 43h, the elastic deformation of the hook portion P3 returns to the original state, and hence the hook portion P3 regulates the movement of the connection member P in the axial direction. For this reason, since the separation of the hook portion P3 is prevented, it is possible to suppress a problem in which the connection member P comes off from the first hole 6h and the second hole 43h. Thus, the steering device 100 according to the modified example of the fifth embodiment easily connects the inner column bracket 4 and the base plate 6 to each other and prevents a problem in which the inner column bracket 4 and the base plate 6 connected to each other are detached from each other.

More specifically, for example, in the modified example of the fifth embodiment, the connection member P is inserted from the second hole 43h. When the end at the hook portion P3 is inserted into the second hole 43h, the hook portion P3 is elastically deformed while contacting the inner wall of the second hole 43h. When the hook portion P3 reaches the rear side concave portion 66 after passing through the second hole 43h and the first hole 6h, the elastic deformation of the hook portion P3 returns to the original state, and hence the hook portion P3 is caught by the edge of the first hole 6h. Further, the hook portion P3 is caught by the edge of the first hole 6h and the head portion P2 is caught by the edge of the second hole 43h. Accordingly, the head portion P2 and the hook portion P3 regulate the movement of the connection member P in the axial direction. For this reason, since the separation of the head portion P2 and the hook portion P3 is prevented, it is possible to suppress a problem in which the connection member P comes off from the first hole 6h and the second hole 43h. In addition, the connection member P may be inserted from the first hole 6h.

As described above, the rear side concave portion 66 is a recess which is formed in the inner column side surface 62 of the base plate 6. For this reason, the rear side concave portion 66 forms a gap between the inner column 51 and the base plate 6 while the inner column side surface 62 contacts the inner column 51. For this reason, in the connection member P, a portion that is projected from the first hole 6h toward the inner column 51 does not easily interfere with the inner column 51. Thus, the steering device 100 according to the modified example of the fifth embodiment may decrease or remove the number of steps of a process performed on the inner column 51 in order to prevent the interference between the connection member P and the inner column 51.

More specifically, for example, in the modified example of the fifth embodiment, the hook portion P3 in the connection member P is disposed in the rear side concave portion 66. For this reason, the hook portion P3 does not easily interfere with the inner column 51. Further, it is desirable that the height of the hook portion P3 in the axial direction of the connection member P is smaller than the depth of the rear side concave portion 66. In this case, the hook portion P3 does not interfere with the inner column 51. Thus, the steering device 100 according to the modified example of the fifth embodiment may decrease or remove the number of steps of a process performed on the inner column 51 in order to prevent the interference between the connection member P and the inner column 51. In addition, the head portion P2 of the connection member P may be disposed in the rear side concave portion 66. In this case, it is desirable that the height of the head portion P2 in the axial direction of the connection member P is smaller than the depth of the rear side concave portion 66.

The connection member P is a mechanical fuse which is broken by a shear force generated in the event of a secondary collision. When an excessive load is applied to the steering wheel 81, the applied load is transmitted to the inner column 51 through the input shaft 82a, and hence the inner column 51 is moved forward. When the inner column 51 moves, the base plate 6 which is fixed through the fixing tool 64 moves forward together. Meanwhile, the inner column bracket 4 which is supported by the first telescopic friction plate 21 does not move. For this reason, since a shear force is applied to the connection member P, the connection member P is cut into a resinous piece Pf1 and a resinous piece Pf2 as illustrated in FIG. 36 when the load applied from the steering wheel 81 exceeds the allowable shear force of the connection member P. For example, in the fifth embodiment, the main body portion P1 of the connection member P is disposed at the boundary portion between the first hole 6h and the second hole 43h. For this reason, the connection member P is cut at the main body portion P1. The allowable shear force of the main body portion P1 is set to be smaller than the allowable shear force of the fixing tool 64. Accordingly, it is possible to suppress a problem in which the fixing tool 64 is cut before the connection member P is cut.

When the connection member P is cut into the resinous piece Pf1 and the resinous piece Pf2, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 may move toward the front side of the vehicle body. Further, even when the connection member P is cut, the outer column 54 is supported by the outer column bracket 52 fixed to the vehicle body side member 13. Further, the inner column 51 is supported by the outer column 54. For this reason, even when the connection member P is cut, the steering column 50 does not drop. Thus, the steering device 100 according to the modified example of the fifth embodiment may suppress a problem in which the steering column 50 is dropped by an erroneous operation even when the setting value (the allowable shear force of the main body portion P1 of the connection member P) of the separation load, in which the steering column 50 moves toward the front side of the vehicle body, is decreased.

Further, the connection member P according to the modified example of the fifth embodiment may easily change the setting value of the separation load in which the steering column 50 moves toward the front side of the vehicle body by adjusting the diameter of the main body portion P1. For this reason, the connection member P according to the modified example of the fifth embodiment may further protect an operator having a light weight by decreasing the setting value of the separation load.

As described above, in the steering device 100 according to the modified example of the fifth embodiment, the connection member P is a resinous pin which is inserted through the first hole 6h and the second hole 43h. Accordingly, while the first hole 6h and the second hole 43h are set to communicate with each other, the resinous pin is inserted into the first hole 6h and the second hole 43h, to connect the inner column bracket 4 and the base plate 6. An operation of inserting the resinous pin may be performed in a short time since the solidification time is not needed compared to the operation of charging and solidifying the resinous member. For this reason, the steering device 100 according to the modified example of the fifth embodiment may easily connect the inner column bracket 4 and the base plate 6 to each other.

Further, in the steering device 100 according to the modified example of the fifth embodiment, the connection member P is formed so that one end is provided with the hook portion P3 having an outer periphery larger than the inner periphery of the first hole 6h and the second hole 43h and the slot P4 is provided from the hook portion P3 toward the other end. Accordingly, when the hook portion P3 is inserted inward from the outer periphery, the hook portion may be easily elastically deformed. When the connection member P is inserted into the first hole 6h and the second hole 43h from the end at the hook portion P3, the hook portion P3 is elastically deformed while contacting the inner walls of the first hole 6h and the second hole 43h. When the hook portion P3 reaches the outside after passing through the first hole 6h and the second hole 43h, the elastic deformation of the hook portion P3 returns the original state, and hence the hook portion P3 regulates the movement of the connection member P in the axial direction. For this reason, since the separation of the hook portion P3 is prevented, it is possible to suppress a problem in which the connection member P comes off from the first hole 6h and the second hole 43h. Thus, the steering device 100 according to the modified example of the fifth embodiment easily connects the inner column bracket 4 and the base plate 6 to each other and may suppress a problem in which the inner column bracket 4 and the base plate 6 connected to each other are detached from each other.

Further, in the steering device 100 according to the modified example of the fifth embodiment, the base plate 6 includes the rear side concave portion 66, which is a recess, in the inner column side surface 62 facing the inner column 51, and the first hole 6h is opened in at least a part of the bottom surface of the rear side concave portion 66. Accordingly, the rear side concave portion 66 forms a gap between the inner column 51 and the base plate 6 while the inner column side surface 62 contacts the inner column 51. For this reason, a portion that is projected from the first hole 6h toward the inner column 51 in the connection member P does not easily interfere with the inner column 51. Thus, the steering device 100 according to the modified example of the fifth embodiment may decrease or remove the number of steps of a process performed on the inner column 51 in order to prevent the interference between the connection member P and the inner column 51.

Sixth Embodiment

Figure 37:
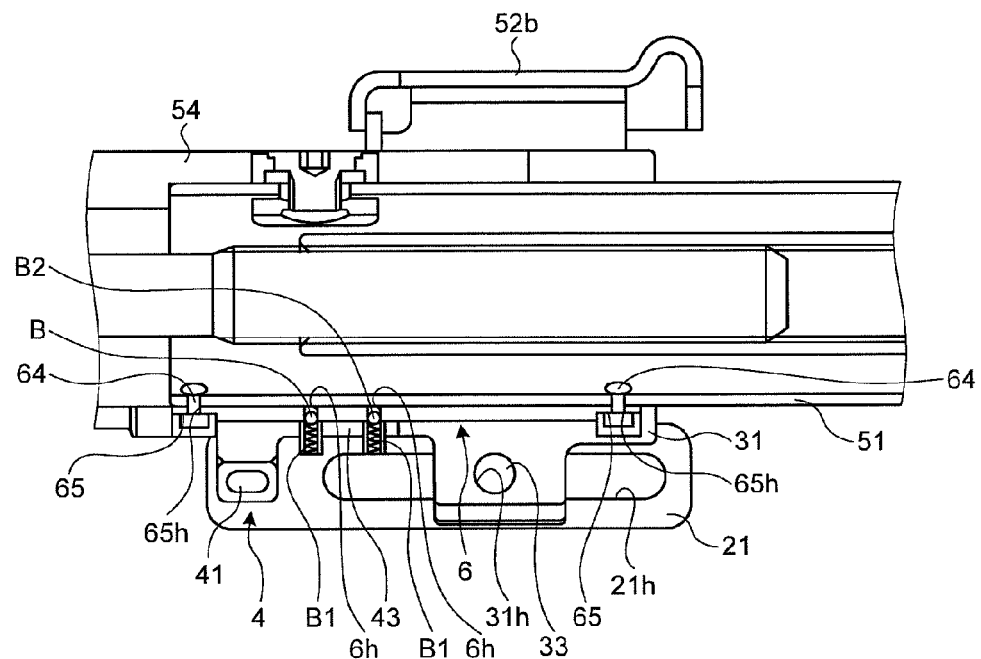
FIG. 37 is a cross-sectional view illustrating a steering device according to a sixth embodiment when taken along the line corresponding to the line e-e of FIG. 26.
Figure 38:
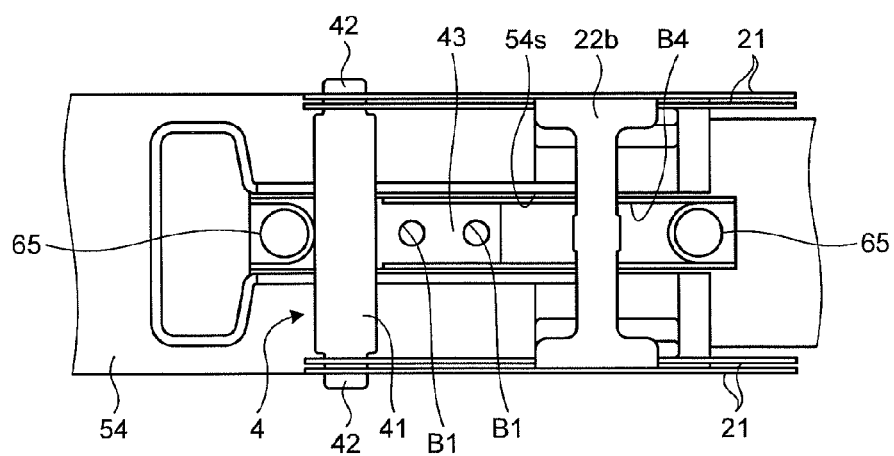
FIG. 38 is a diagram illustrating a bottom surface of the steering device according to the sixth embodiment.
Figure 39A:
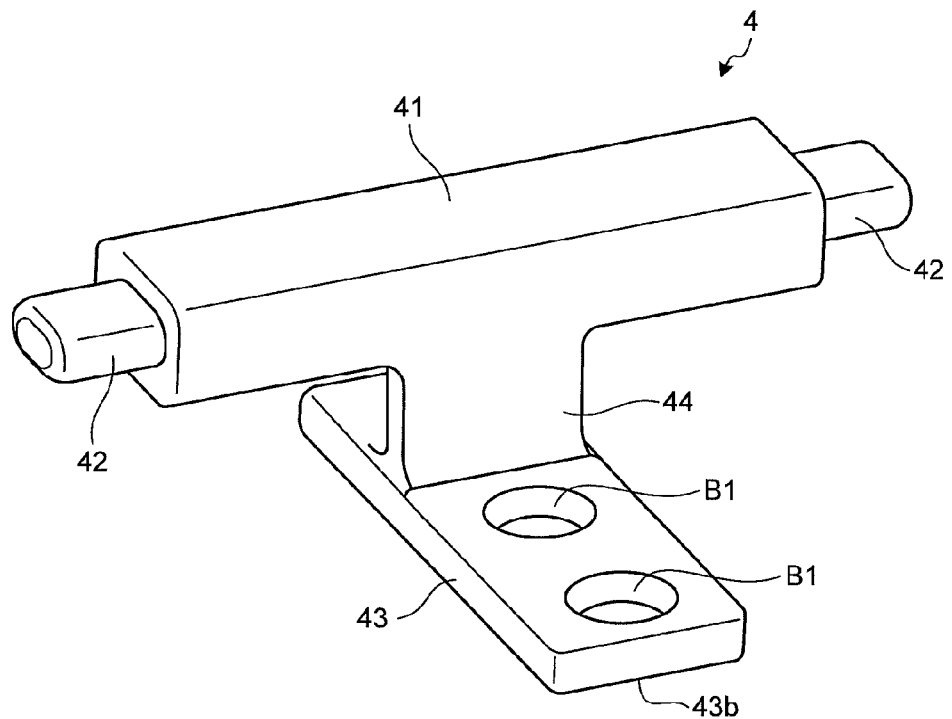
FIG. 39A is a perspective view illustrating an inner column bracket according to the sixth embodiment, specifically, a perspective view when viewed from the upside.
Figure 39B:
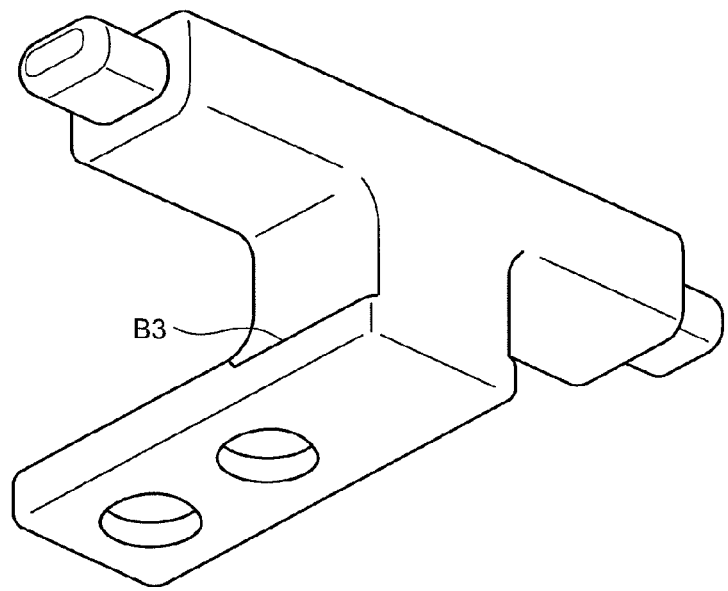
FIG. 39B is a perspective view illustrating an inner column bracket according to the sixth embodiment, specifically, a perspective view when viewed from the downside.
Figure 40:
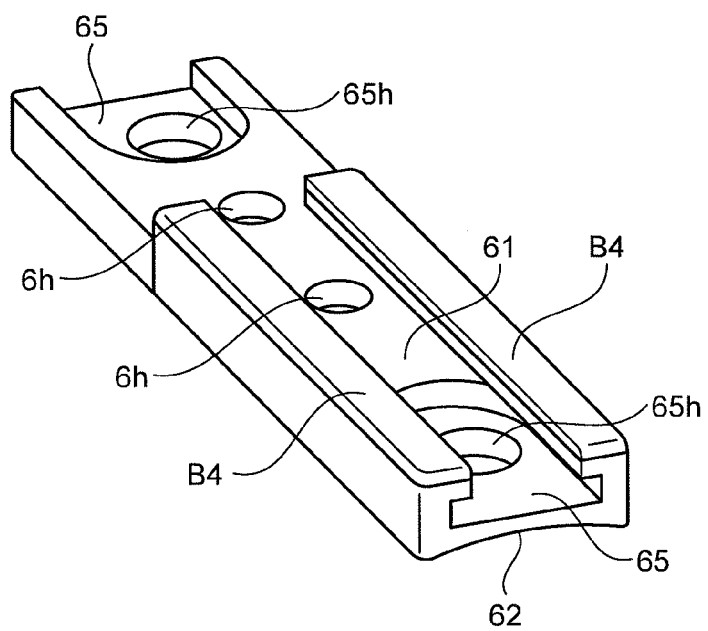
FIG. 40 is a perspective view illustrating a base plate according to the sixth embodiment when viewed from a bracket side surface.

FIG. 37 is a cross-sectional view illustrating a steering device according to a sixth embodiment when taken along the line corresponding to the line e-e of FIG. 26. FIG. 38 is an enlarged diagram illustrating a bottom surface of the steering device according to the sixth embodiment. FIGS. 39A and 39B are perspective views illustrating an inner column bracket according to the sixth embodiment when viewed from the upside and the downside. FIG. 40 is a perspective view illustrating a base plate according to the sixth embodiment. The steering device 100 is different from that of the fifth embodiment in that the connection member P is a ball plunger B. In addition, the same reference signs will be given to the same components as those of the above-described embodiments, and the repetitive description thereof will not be presented.

As illustrated in FIG. 37, since the ball plunger B is inserted into a position straddling the first hole 6h and the main body screw hole portion B1, the leg portion 43 of the inner column bracket 4 and the base plate 6 are detachably connected to each other. A guide groove portion B3 of the inner column bracket 4 is assembled into a guide portion B4 of the base plate 6 in advance, and the inner column bracket 4 is fitted to the inner column 51. In addition, the leg portion 43 of the inner column bracket 4 may not include the front side concave portion 45 illustrated in the fifth embodiment as illustrated in FIGS. 37 and 38.

In the sixth embodiment, the connection member P is the ball plunger B. For example, the body may be formed of iron. As illustrated in FIG. 37, the external shape includes a screw thread, and one end of the main body portion is provided with a head portion B2. In general, the ball plunger B is used for an identifying operation or a positioning operation, and a spring and a ball are provided inside the body. As the ball pressed by the spring, the head portion B2 is exemplified in which a part of the ball is projected from the body. Due to an external load applied to the head portion B2 of the ball, there is a feature in which the ball plunger moves (yields) in a direction opposite to the projection direction. The yielding load may be changed by the adjustment of the spring inside the ball plunger B, and this is one feature of the ball plunger. The second hole 43h of the inner column bracket 4 has a female main body screw hole portion B1, and the ball plunger B is screwed and inserted into the female main body screw hole portion B1 and fixed. The head portion B2 of one end is positioned while being pressed into the first hole 6h of the base plate 6 by the spring. Regarding a pressing force which is generated by the head portion B2 of the ball plunger B, the pressing force of the head portion B2 is received while the guide groove portion B3 of the inner column bracket 4 is fitted into the guide portion B4 of the base plate 6. Further, in order to further improve the effect of the pressing force of the head portion B2, it is desirable to set a relation in which the diameter of the first hole 6h is smaller than the diameter of the main body screw hole portion B1 in a projected state, and is substantially equal to or smaller than the ball diameter of the projected ball of the head portion B2. That is, it is desirable to set a relation of the diameter of the main body screw hole portion B1>the diameter of the head portion B2>the diameter of the first hole 6h.

In a state where the first hole 6h and the main body screw hole portion B1 communicate with each other, the head portion B2 of the ball plunger B is inserted into the first hole 6h, and the guide groove portion B3 of the inner column bracket 4 is assembled into the guide portion B4 of the base plate 6 so that the inner column bracket 4 and the base plate 6 are integrated with each other. In this case, the ball plunger B may be fixed to a position where a tension is applied to the head portion B2 of the projected ball. Further, an operation of inserting the ball plunger B may be performed in a short time since the solidification time is not needed compared to the operation of charging and solidifying the resinous member. For this reason, the steering device 100 according to the sixth embodiment may easily integrate the inner column bracket 4 and the base plate 6 with each other. Further, it is possible to suppress a problem in which the connection member P comes off from the first hole 6h and the second hole 43h by the guide structure (the guide portion B4 and the guide groove portion B3).

The connection member P is a kind of a mechanical fuse that is deformed by a shear force generated in the event of a secondary collision. When an excessive load is applied to the steering wheel 81, the applied load is transmitted to the inner column 51 through the input shaft 82a, and hence the inner column 51 is moved forward. When the inner column 51 moves, the base plate 6 which is fixed through the fixing tool 64 moves forward together. Meanwhile, the inner column bracket 4 which is supported by the first telescopic friction plate 21 does not move. For this reason, since a shear force is applied to the connection member P in the thrust direction, the head portion B2 of the connection member P is detached from the first hole 6h when the load applied from the steering wheel 81 exceeds the allowable deformation force of the connection member P. For example, in the sixth embodiment, the head portion B2 of the connection member P is disposed at the boundary portion between the first hole 6h and the second hole 43h. The allowable deformation force (a force in the yielding direction) of the head portion B2 is set to be smaller than the allowable shear force of the fixing tool 64. Accordingly, it is possible to suppress a problem in which the fixing tool 64 is cut before the connection member P is deformed.

When the head portion B2 of the connection member P is deformed so that the front end of the head portion B2 yields, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 may move toward the front side of the vehicle body. Further, even when the connection member P is released, the outer column 54 is supported by the outer column bracket 52 fixed to the vehicle body side member 13. Further, the inner column 51 is supported by the outer column 54. For this reason, even when the connection member P is released, the steering column 50 does not drop. Thus, the steering device 100 according to the sixth embodiment may suppress a problem in which the steering column 50 is dropped by an erroneous operation even when the setting value (the allowable shear force of the main body portion P1 of the connection member P) of the separation load, in which the steering column 50 moves toward the front side of the vehicle body, is decreased.

Further, the connection member P according to the sixth embodiment may easily change the setting value of the separation load in which the steering column 50 moves toward the front side of the vehicle body by adjusting the pressing force of the head portion B2 of the ball plunger B or changing the selected object. For this reason, the connection member P according to the sixth embodiment may further protect an operator having a light weight by decreasing the setting value of the separation load.

As described above, in the steering device 100 according to the sixth embodiment, the connection member P is the ball plunger B which is inserted into the first hole 6h and the second hole 43h. Accordingly, when the ball plunger B is inserted into the first hole 6h and the second hole 43h while the first hole 6h and the second hole 43h communicate with each other, the inner column bracket 4 and the base plate 6 are connected to each other. An operation of inserting the ball plunger B may be performed in a short time since the solidification time is not needed compared to the operation of charging and solidifying the resinous member. For this reason, the steering device 100 according to the sixth embodiment may easily connect the inner column bracket 4 and the base plate 6 to each other.

Further, since the head portion B2 can be projected even when the ball plunger B yields by an external force, there is a high possibility that the connection between the inner column bracket 4 and the base plate 6 may be restored due to the inner column 51 returned to the original position. Accordingly, there is an advantage that the steering operation may be promptly performed.

REFERENCE SIGNS LIST 12, 13 VEHICLE BODY SIDE MEMBER
21 FIRST TELESCOPIC FRICTION PLATE
21h TELESCOPIC ADJUSTMENT HOLE
22 SECOND TELESCOPIC FRICTION PLATE
22a FRICTION PORTION
22b CONNECTION PORTION
22c CURVED PORTION
22h ROD PENETRATION HOLE
23h TILT ADJUSTMENT HOLE
31 ROD PENETRATION HOLE
31h ROD PENETRATION HOLE
33 ROD
4 INNER COLUMN BRACKET
41 ARM PORTION
42 INSERTION PORTION
43 LEG PORTION
43b BASE PLATE SIDE SURFACE
43h SECOND HOLE
44 NECK PORTION
45 FRONT SIDE CONCAVE PORTION
50 STEERING COLUMN
51 INNER COLUMN
52 OUTER COLUMN BRACKET
52a FRAME-SHAPED SUPPORT PORTION
52b ATTACHMENT PLATE PORTION
52h ATTACHMENT HOLE
53 MANIPULATION LEVER
54 OUTER COLUMN
54s SLIT
55 PIVOT BRACKET
55a ROTATION SHAFT
6 BASE PLATE
6h FIRST HOLE
61 BRACKET SIDE SURFACE
62 INNER COLUMN SIDE SURFACE
64 FIXING TOOL
65 FIXING TOOL CONCAVE PORTION
65h FIXING TOOL HOLE
66 REAR SIDE CONCAVE PORTION
81 STEERING WHEEL
82 STEERING SHAFT
82a INPUT SHAFT
82b OUTPUT SHAFT
84 UNIVERSAL JOINT
85 LOWER SHAFT
86 UNIVERSAL JOINT
87 PINION SHAFT
100 STEERING DEVICE
101 STEERING HANDLE
102 RACK HOUSING
103 PINION
104 TIE ROD
105 FEMALE STEERING SHAFT
106 MALE STEERING SHAFT
107 CROSS JOINT
108 INTERMEDIATE SHAFT
109 CROSS JOINT
110 STEERING DEVICE
120 STEERING COLUMN APPARATUS
121 INNER COLUMN
122 OUTER COLUMN
123 TILT BRACKET
1231 VEHICLE BODY MOUNTING SIDE BRACKET
1232 PRESSING BRACKET
124 FIXED BRACKET
125 TELESCOPIC MULTIPLATE
126 TELESCOPIC MULTIPLATE
127 TILT LEVER
128 TILT BOLT HOLE
129 TIGHTENING MECHANISM
130 MANIPULATION PORTION
131 ROLLING BEARING
132 TILT BOLT
133 CAM LOCK MECHANISM
134 NUT
135 ROLLING BEARING
136 SEPARATION PREVENTING MECHANISM
137 SHEAR PIN
138 SHEAR PIN

139 INNER COLUMN CONTACT SURFACE
140 SHEAR PIN HOLE
141 SHEAR PIN HOLE
142 FIXED PORTION
143 FIXED PORTION
144 TRANSVERSE BEAM PORTION
145 COLUMN PORTION
146 MOUNTING PORTION
147 DISTANCE BRACKET
148 CAM AND GEAR MECHANISM
149 SHEAR PIN
150 SHEAR PIN
151 MOVABLE GEAR LOCK
152 FIXED GEAR LOCK
153 TILT BOLT CENTER PORTION
154 CAM MECHANISM
155 ECCENTRIC CAM
156 PRESSING BLOCK
157 PRESSING BLOCK
158 INNER PLATE
159 CONCAVE PORTION
160 FITTING PROTRUSION
161 FITTING HOLE
162 INJECTION PORT
B BALL PLUNGER
B1 MAIN BODY SCREW HOLE PORTION
B2 HEAD PORTION
B3 GUIDE GROOVE PORTION
B4 GUIDE PORTION
M, P CONNECTION MEMBER
P1 MAIN BODY PORTION
P2 HEAD PORTION
P3 HOOK PORTION
P4 SLOT
VB VEHICLE BODY

The invention claimed is:

1. A steering device comprising:
an inner column having a cylindrical shape and supporting an input shaft connected to a steering wheel;
a base plate having a first hole opened therein, and provided on an outer periphery surface of the inner column;
an outer column having a cylindrical shape into which at least a part of the inner column is inserted, and having a slit formed by notching one end of the outer column into which the inner column is inserted;
an outer column bracket fixed to a vehicle body side member so as to support the outer column and to tighten the outer column along with a telescopic friction plate having a plate shape;
an inner column bracket having a second hole opened therein and supported by the telescopic friction plate; and
a connection member provided at a position straddling the first hole and the second hole, and detachably connecting the base plate and the inner column bracket.

2. The steering device according to claim 1,
wherein an allowable shear force of the connection member is smaller than an allowable shear force of a fixing tool connecting the base plate and the inner column to each other.

3. The steering device according to claim 1,
wherein the inner column bracket includes a front side concave portion, which is a recess, in a surface opposite to a surface facing the base plate,
the second hole is opened in at least a part of a bottom surface of the front side concave portion, and
the connection member is a resinous member that is injected into the first hole, the second hole, and the front side concave portion.

4. The steering device according to claim 1,
wherein the base plate includes a rear side concave portion which is a recess in a surface facing the inner column,
the first hole is opened in at least a part of a bottom surface of the rear side concave portion, and
the connection member is a resinous member that is injected into the first hole, the second hole, and the rear side concave portion.

5. The steering device according to claim 1,
wherein the connection member is a resinous pin that is inserted through the first hole and the second hole.

6. The steering device according to claim 5,
wherein the connection member is provided so that a hook portion having an outer periphery larger than the inner periphery of each of the first hole and the second hole is provided at one end and a slot is provided from the hook portion toward the other end.

7. The steering device according to claim 5,
wherein the base plate includes a rear side concave portion, which is a recess, in a surface facing the inner column, and
the first hole is opened in at least a part of a bottom surface of the rear side concave portion.

8. The steering device according to claim 1,
wherein the connection member is a ball plunger of which a ball plunger body is fixed to the second hole and a head portion of a ball at a front end engages with the first hole.

9. The steering device according to claim 8,
wherein an allowable deformation force of the head portion of the ball plunger is smaller than an allowable shear force of a fixing tool connecting the base plate and the inner column to each other.

10. The steering device according to claim 1,
wherein the base plate includes a fixing tool concave portion which is a recess in a surface facing the inner column bracket,
a fixing tool hole as a penetration hole is opened in a part of a bottom surface of the fixing tool concave portion, and
the fixing tool connecting the base plate and the inner column bracket to each other is inserted into the fixing tool hole.

* * * * *